United States Patent
Rutten

(10) Patent No.: US 10,295,684 B2
(45) Date of Patent: May 21, 2019

(54) SYSTEMS AND METHODS FOR CONSTRUCTING CLEAN STRATIGRAPHIC SEISMIC TRACES TO ENHANCE INTERPRETATION OF GEOLOGICAL FAULTS

(71) Applicant: Landmark Graphics Corporation, Houston, TX (US)

(72) Inventor: Kees W Rutten, Rolde (NL)

(73) Assignee: Landmark Graphics Corporation, Houston, TX (US)

(*) Notice: Subject to any disclaimer, the term of this patent is extended or adjusted under 35 U.S.C. 154(b) by 0 days.

(21) Appl. No.: 14/236,601

(22) PCT Filed: May 15, 2013

(86) PCT No.: PCT/US2013/041112
§ 371 (c)(1),
(2) Date: Jan. 31, 2014

(87) PCT Pub. No.: WO2014/185898
PCT Pub. Date: Nov. 20, 2014

(65) Prior Publication Data
US 2016/0070012 A1    Mar. 10, 2016

(51) Int. Cl.
G01V 1/00 (2006.01)
G01V 1/30 (2006.01)
G01V 1/28 (2006.01)

(52) U.S. Cl.
CPC .............. *G01V 1/301* (2013.01); *G01V 1/28* (2013.01); *G01V 2210/642* (2013.01)

(58) Field of Classification Search
CPC .................................. G01V 1/30; G01V 1/24
See application file for complete search history.

(56) References Cited

U.S. PATENT DOCUMENTS

| | | | |
|---|---|---|---|
| 3,328,754 A * | 6/1967 | Dransfield | F16C 19/54 346/33 C |
| 4,661,935 A * | 4/1987 | Shock | G01V 1/32 346/33 C |
| 4,715,021 A * | 12/1987 | Dittert | G01V 1/366 367/41 |
| 5,537,320 A | 7/1996 | Simpson et al. | |
| 5,940,778 A * | 8/1999 | Marfurt | G01V 1/28 702/13 |
| 6,018,498 A | 1/2000 | Neff et al. | |
| 6,092,026 A | 7/2000 | Bahorich et al. | |
| 6,791,900 B2 * | 9/2004 | Gillard | G01V 1/30 367/40 |
| 7,706,981 B2 | 4/2010 | Wilkinson et al. | |

(Continued)

OTHER PUBLICATIONS

Luo et al, Unfaulting and unfolding 3D seismic images, 2012, CWP-722, pp. 221-231.*

(Continued)

*Primary Examiner* — Stephanie E Bloss
*Assistant Examiner* — Lisa E Peters
(74) *Attorney, Agent, or Firm* — Kilpatrick Townsend & Stockton LLP

(57) ABSTRACT

Systems and methods for constructing clean stratigraphic seismic traces to enhance interpretation of geological faults using diagnostic displays, diagnostic tools, and fault quality validation techniques.

38 Claims, 20 Drawing Sheets

(56) References Cited

U.S. PATENT DOCUMENTS

| | | | | |
|---|---|---|---|---|
| 8,600,708 B1* | 12/2013 | Mallet | ............... | G06T 17/05 |
| | | | | 703/2 |
| 2003/0043693 A1* | 3/2003 | Eastwood | ............ | G01V 1/366 |
| | | | | 367/41 |
| 2003/0231548 A1* | 12/2003 | Gillard | ............... | G01V 1/30 |
| | | | | 367/40 |
| 2005/0192682 A1* | 9/2005 | Keskes | ............... | G01V 1/50 |
| | | | | 700/52 |
| 2010/0161300 A1* | 6/2010 | Yeten | ............... | E21B 43/00 |
| | | | | 703/10 |
| 2011/0051553 A1* | 3/2011 | Scott | ............... | G01V 1/282 |
| | | | | 367/38 |
| 2011/0307178 A1* | 12/2011 | Hoekstra | ............ | G01V 1/28 |
| | | | | 702/5 |
| 2012/0283953 A1* | 11/2012 | Bo | ............... | G01V 1/30 |
| | | | | 702/14 |

OTHER PUBLICATIONS

Thomas, Shane, The International Search Report and the Written Opinion of the International Searching Authority, PCT/US2013/041112, dated Nov. 14, 2013, 8 pages, ISA/US.

EP13884866.8, "Extended European Search Report", dated Sep. 29, 2016, 7 pages.

PCT/US2013/041112, "International Preliminary Report on Patentability", dated Nov. 26, 2015, 6 pages.

PCT/US2013/041112, "International Search Report and Written Opinion", dated Nov. 14, 2013, 7 pages.

\* cited by examiner

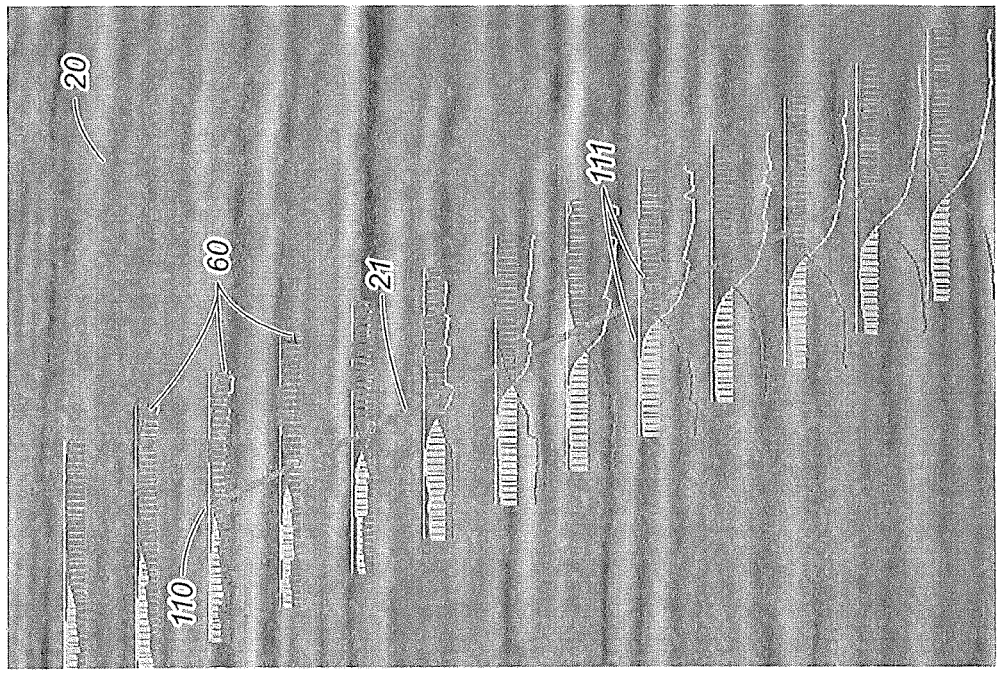
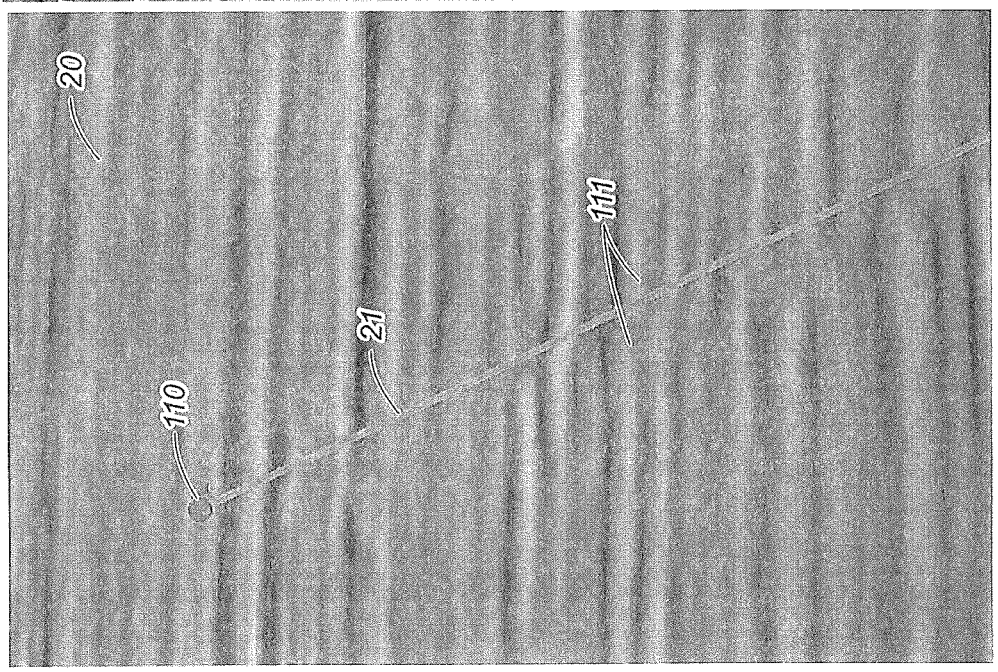
FIG. 11B
FIG. 11A

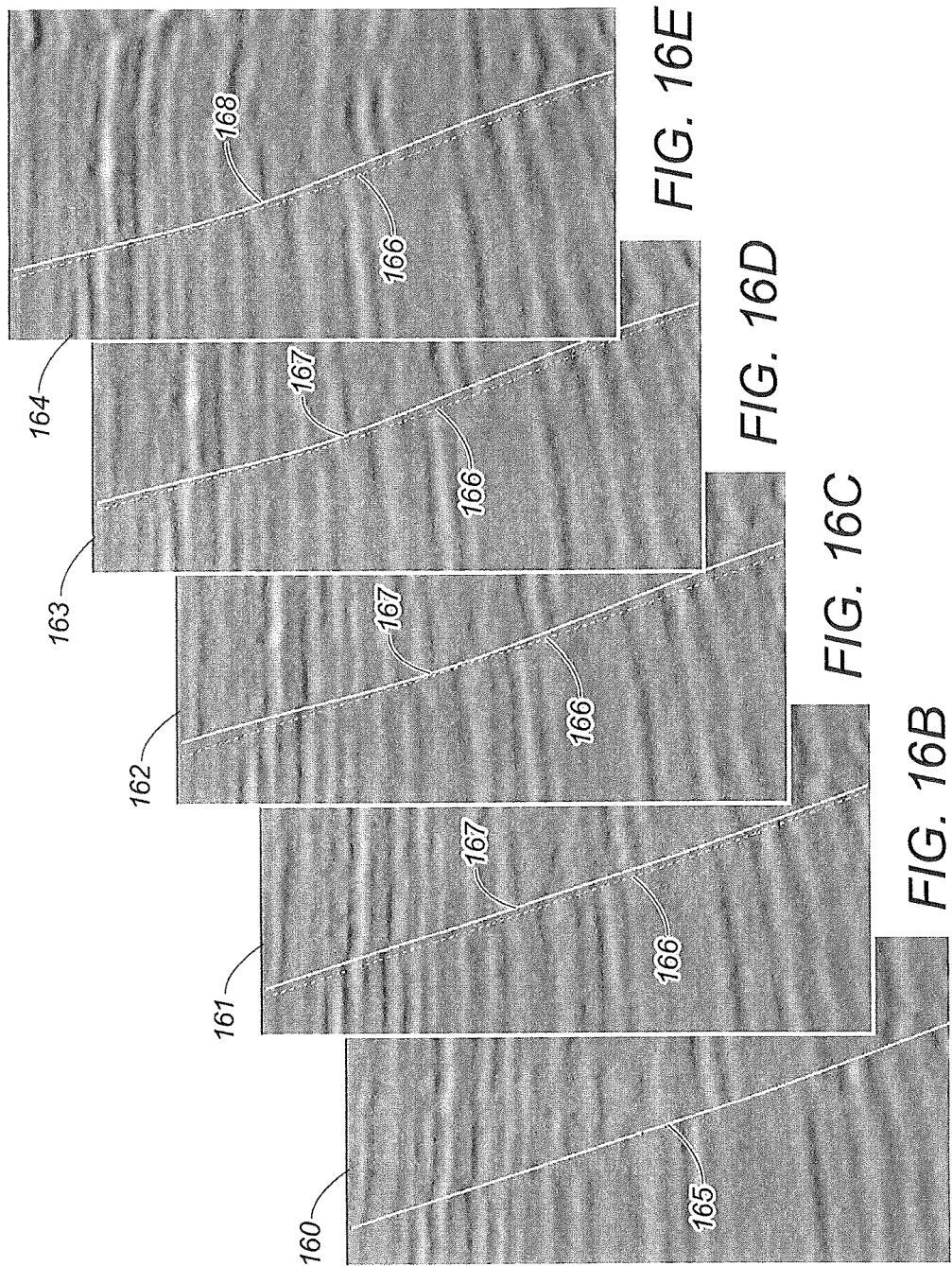

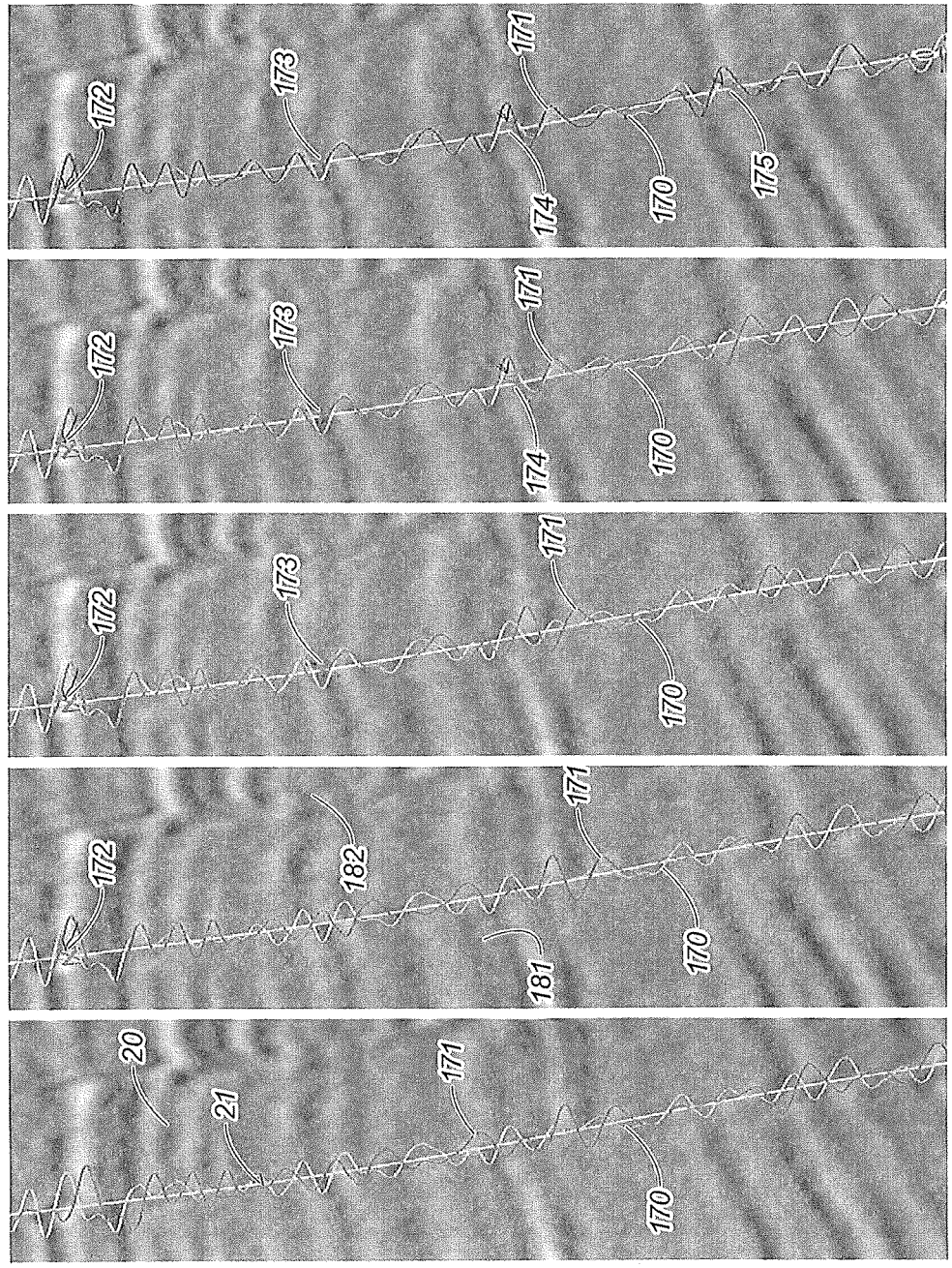

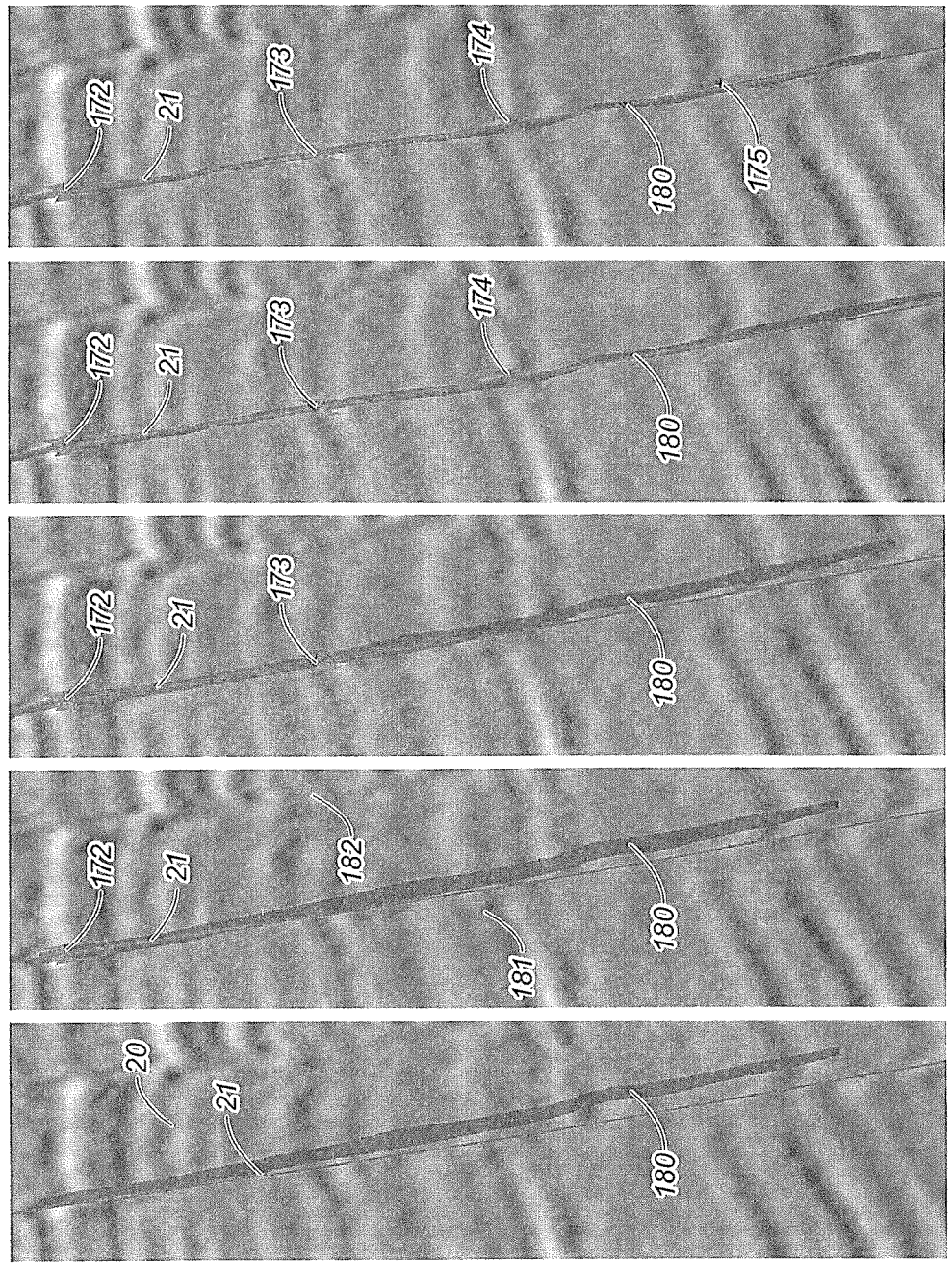

SYSTEMS AND METHODS FOR CONSTRUCTING CLEAN STRATIGRAPHIC SEISMIC TRACES TO ENHANCE INTERPRETATION OF GEOLOGICAL FAULTS

CROSS-REFERENCE TO RELATED APPLICATIONS

The priority of PCT Patent Application No. PCT/US2013/41112, filed on May 15, 2013, is hereby claimed, and the specification thereof is incorporated herein by reference.

STATEMENT REGARDING FEDERALLY SPONSORED RESEARCH

Not applicable.

FIELD OF THE INVENTION

The present invention generally relates to systems and methods for constructing clean stratigraphic seismic traces to enhance the interpretation of geological faults. More particularly, the present invention relates to constructing clean stratigraphic seismic traces to enhance the interpretation of geological faults using diagnostic displays, diagnostic tools, and fault quality validation techniques.

BACKGROUND OF THE INVENTION

In hydrocarbon evaluations, mapping faults is essential to determine migration pathways and to establish lateral limits of reservoirs. Faults can also fragment a reservoir. Traditionally, faults are picked by hand in 2D or 3D seismic volumes as discontinuities in seismic amplitudes and seismic character on sections and time slices. This is the most time-consuming process in hydrocarbon evaluation workflows.

In recent years, there have been several attempts to automate fault interpretation. These attempts generally rely on processing seismic volumes to highlight faults followed by tracking faults in such fault-enhanced volumes. Fault-enhanced volumes show fault-related discontinuity patches that are oriented vertically and are usually much shorter than faults due to short processing windows. Patches may, however, also be caused by seismic acquisition and processing artifacts, by stratigraphic discontinuities such as multiple river channels in lower-coastal plain settings and by hydrocarbon effects. Interactive fault trackers rely on a seed fault identified by the interpreter, which makes fault tracking more reliable but is still limited by the quality of fault-enhanced volumes.

Unfortunately, seismic data volumes do not always have the quality required for fault-enhanced volumes that are suitable for automatic fault-extraction methods. This may make it necessary to revert to traditional manual interpretation. Even in cases where the fault-enhanced volumes are good enough to make automatic fault extraction work, there may still be a need to edit and/or delete the resulting faults by hand. Even with the advent of automatic fault extraction, there is a need for tools to help in the manual interpretation process by fault location "snapping," by interactive fault tracking and by calculating fault throw, which must be underpinned by rigorous, consistent and independent assessments of fault quality.

BRIEF DESCRIPTION OF THE DRAWINGS

The present invention is described below with references to the accompanying drawings in which like elements are referenced with like reference numerals, and in which:

FIGS. 11A and 11B are displays illustrating another diagnostic tool (fault tip) calculated in step 104 of FIG. 1.

FIGS. 16A-16E are displays illustrating the results of another fault tracking application (3D snake tracker) performed in step 107 of FIG. 1.

FIGS. 17A-17E are displays illustrating the results of an unfaulting application manually performed in step 108 of FIG. 1 using the clean stratigraphic seismic traces in FIGS. 5A-5B for quality-control.

FIGS. 18A-18E are displays illustrating the results of another unfaulting application manually performed in step 108 of FIG. 1 using the fault throw calculation in FIGS. 12A-12D for quality control.

DETAILED DESCRIPTION OF THE PREFERRED EMBODIMENTS

Figure 1:
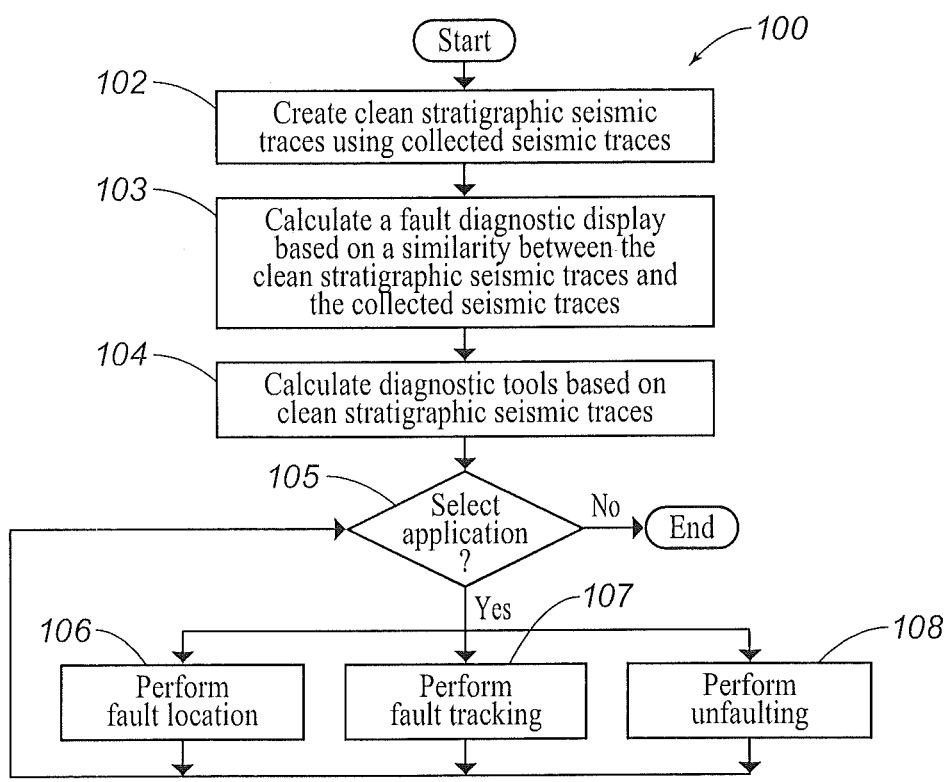
FIG. 1 is a flow diagram illustrating one embodiment of a method for implementing the present invention.

The present invention therefore, overcomes one or more deficiencies in the prior art by providing systems and methods for constructing clean stratigraphic seismic traces to enhance the interpretation of geological faults using diagnostic displays, diagnostic tools, and fault quality validation techniques.

SUMMARY OF THE INVENTION

In one embodiment, the present invention includes a computer implemented method for creating clean stratigraphic seismic traces, which comprises: a) selecting a first seismic trace beyond a seismic trace gap from a plurality of seismic traces collected parallel to a side of a seed fault; b) calculating cross-correlation coefficients for the selected seismic trace with a next seismic trace for a predetermined number of vertical shifts up and down; c) applying a parabolic curve fit to each cross-correlation coefficient to obtain i) a sub-sample shift between the selected seismic trace and the next seismic trace, and ii) a value of a peak of the parabolic curve fit represented as a score; d) accumulating the sub-sample shift(s) between the selected seismic trace and the next seismic trace; e) selecting the next seismic trace beyond the seismic trace gap from the plurality of collected seismic traces; f) repeating steps b) through e) until the score is not greater than a predetermined threshold and there are no more seismic traces in the plurality of collected seismic traces; g) extrapolating the accumulated sub-sample shifts across the seismic trace gap back to the seed fault to form a line or a surface using a computer processor; h) calculating a clean stratigraphic seismic trace using the computer processor by stacking the plurality of collected seismic trace along the line or the surface on the side of the seed fault beyond the seismic trace gap.

In another embodiment, the present invention includes a non-transitory program carrier device tangibly carrying computer executable instructions for creating clean stratigraphic seismic traces, the instructions being executable to implement: a) selecting a first seismic trace beyond a seismic trace gap from a plurality of seismic traces collected parallel to a side of a seed fault; b) calculating cross-correlation coefficients for the selected seismic trace with a next seismic trace for a predetermined number of vertical shifts up and down; c) applying a parabolic curve fit to each cross-correlation coefficient to obtain i) a sub-sample shift between the selected seismic trace and the next seismic trace, and ii) a value of a peak of the parabolic fit represented as a score; d) accumulating the sub-sample shift(s) between the selected seismic trace and the next seismic trace; e) selecting the next seismic trace beyond the seismic trace gap from the plurality of collected seismic traces; f) repeating steps b) through e) until the score is not greater than a predetermined threshold and there are no more seismic traces in the plurality of collected seismic traces; g) extrapolating the accumulated sub-sample shifts across the seismic trace gap back to the seed fault to formula line or a surface using a computer processor; h) calculating a clean stratigraphic seismic trace using the computer processor by stacking the plurality of collected seismic traces along the line or the surface on the side of the seed fault beyond the seismic trace gap.

A non-transitory program carrier device tangibly carrying computer executable instructions for creating clean stratigraphic seismic traces, the instructions being executable to implement; a) selecting a first seismic trace beyond a seismic trace gap from a plurality of seismic traces collected parallel to a side of a seed fault; b) calculating cross-correlation coefficients for the selected seismic trace with a next seismic trace for a predetermined number of vertical shifts up and down; c) applying a parabolic curve fit to each cross-correlation coefficient to obtain i) a sub-sample shift between the selected seismic trace and the next seismic trace, and ii) a value of a peak of the parabolic fit represented as a score; d) accumulating the sub-sample shift(s) between the selected seismic trace and the next seismic trace; e) selecting the next seismic trace beyond the seismic trace gap from the plurality of collected seismic traces; f) repeating steps b) through e) until the score is not greater than a predetermined threshold and there are no more seismic traces in the plurality of collected seismic traces; g) extrapolating the accumulated sub-sample shifts across the seismic trace gap back to the seed fault to form a line or a surface using a computer processor; h) calculating a clean stratigraphic seismic trace using the computer processor by stacking the plurality of collected seismic traces along the line or the surface on the side of the seed fault beyond the seismic trace gap; and i) repeating steps a) through h) for another plurality of seismic races collected on another side of the seed fault.

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied in other industries, such as water resource management, carbon sequestration or medical imaging, to achieve similar results.

Method Description

Referring now to FIG. 1, a flow diagram of one embodiment of a method 100 for implementing the present invention is illustrated.

In step 102, clean stratigraphic seismic traces are created using collected seismic traces and cross-correlation techniques that are well-known in the art. One embodiment of a method for performing this step is described further in reference to FIG. 2.

Figure 2:
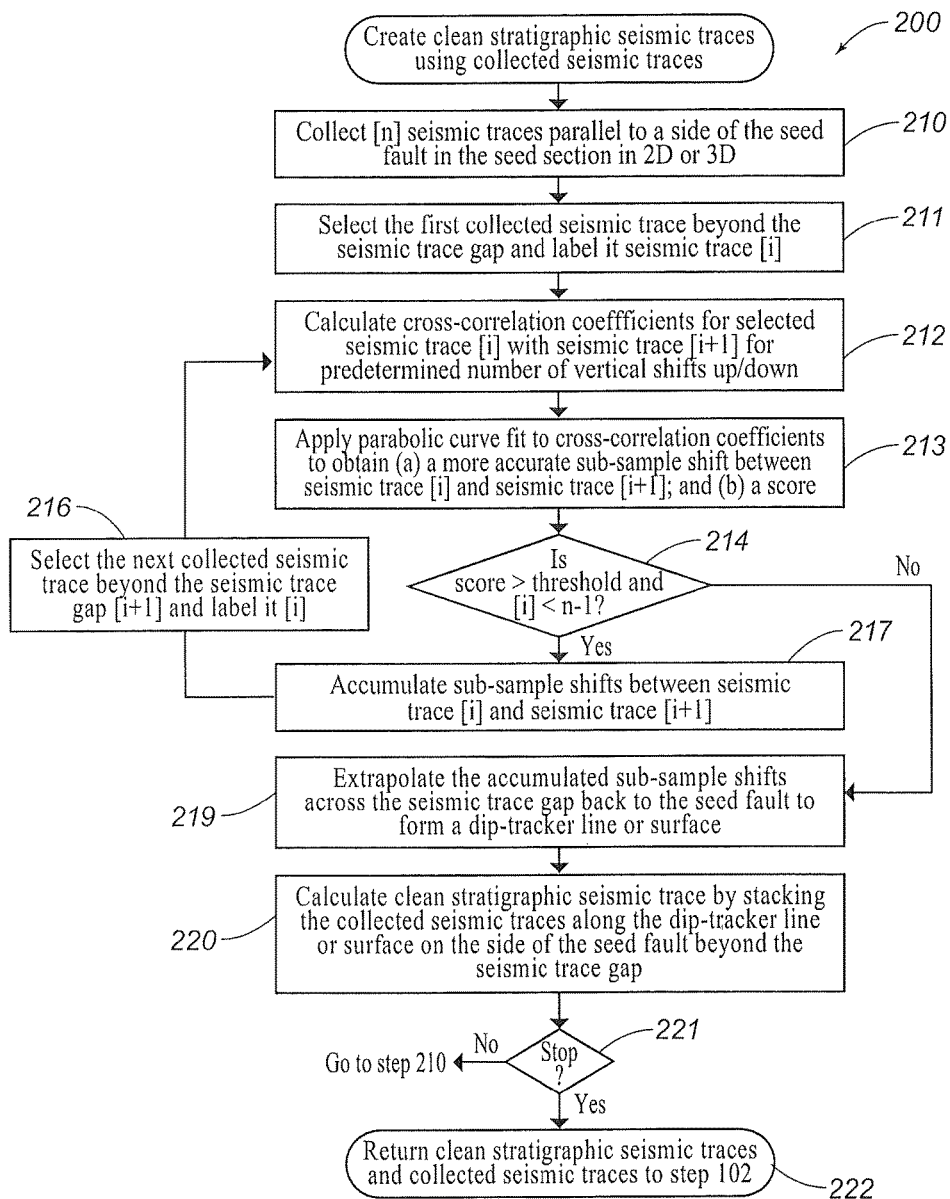
FIG. 2 is a flow diagram illustrating one embodiment of a method for performing step 102 in FIG. 1.

Referring now to FIG. 2, a flow diagram of one embodiment of method 200 for performing step 102 in FIG. 1 is illustrated.

Figure 3B:
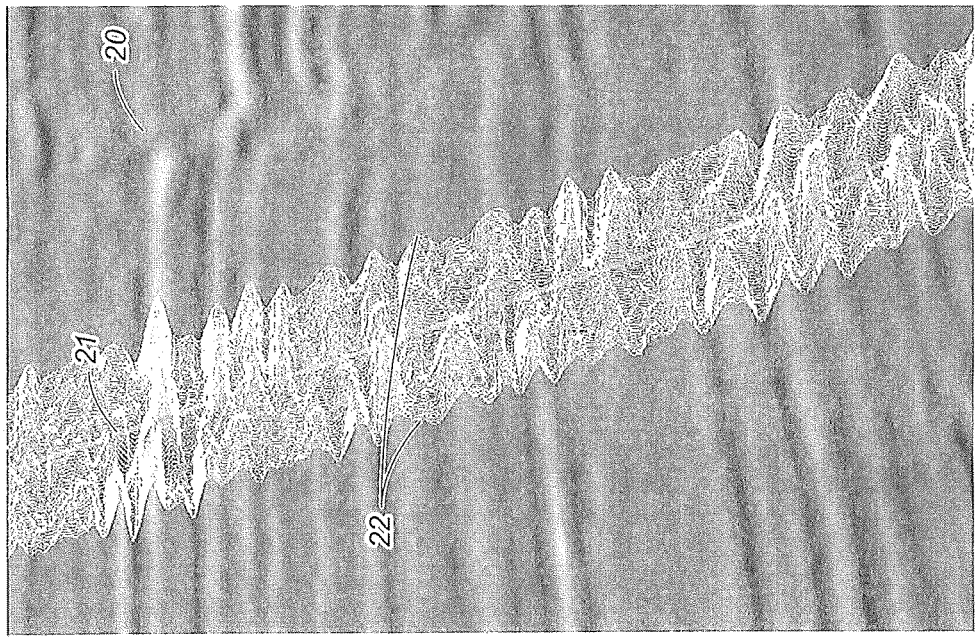
FIG. 3B is a display of seismic traces collected parallel to a side of the seed fault in FIG. 3A.
Figure 3A:
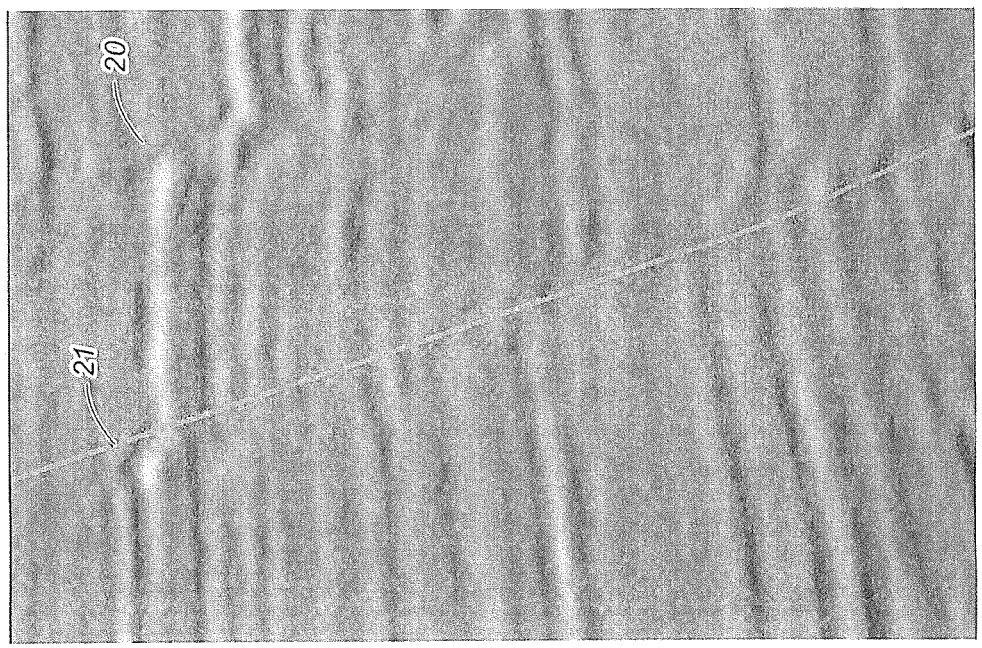
FIG. 3A is a display of a seismic section and seed fault illustrating step 210 in FIG. 2.

In step 210, a predetermined number [n] of seismic traces parallel to a side of a seed fault in the seed section in 2D or 3D are collected. In FIG. 3A, the extraction starts with displaying a seismic section 20 with a seed fault 21. The seed fault is close to but does not need to coincide with the clearly visible discontinuity in the seismic data. Seismic interpreters will judge that in the upper part the seed fault is too far to the right and in the lower part it is too far to the left. The seed fault is a line in 2D or a surface in 3D. The seed fault can be hand-interpreted or extrapolated or interpolated from nearby interpretations. The seed fault can also originate from an automatic fault tracker. The seed fault can be a line in a 2D section or a 3D surface. If the seismic survey is 3D and no seed fault surface is available, it is constructed by orthogonal projection of the seed-fault line onto adjacent sections. The seed fault surface allows extraction of seismic traces from the 3D seismic volume. The vertical axis of the seismic section 20 can be in units of two-way time or depth. It is referred to as the depth axis. In FIG. 3B, the collected seismic traces 22 parallel to a side of the seed fault 21 are illustrated in 2D. The seismic traces are interpolated such that along-trace sample interval distances are constant, at the vertical spacing of the seismic samples. The lateral interval between the collected seismic traces is the same as the horizontal spacing of the seismic samples. The number of collected seismic traces on one side of the seed fault 21 is 40 in FIG. 3B. The lower limit of the number of seismic traces is imposed by the quality of the seismic data close to the fault and the upper limit is imposed by stratigraphic variation away from the fault and by the spacing between faults. Practical values are therefore, between 40 and 60 collected seismic traces. In some of the later processing, seismic traces close to the fault are skipped to avoid poor seismic data at and around the fault that is often caused by seismic migration artifacts. This skipping is referred to as the seismic trace gap. The seismic trace gap is generally between 5 and 20 seismic traces.

In step 211, a first collected seismic trace is selected beyond the gap and labeled seismic trace [i].

Figure 4C:
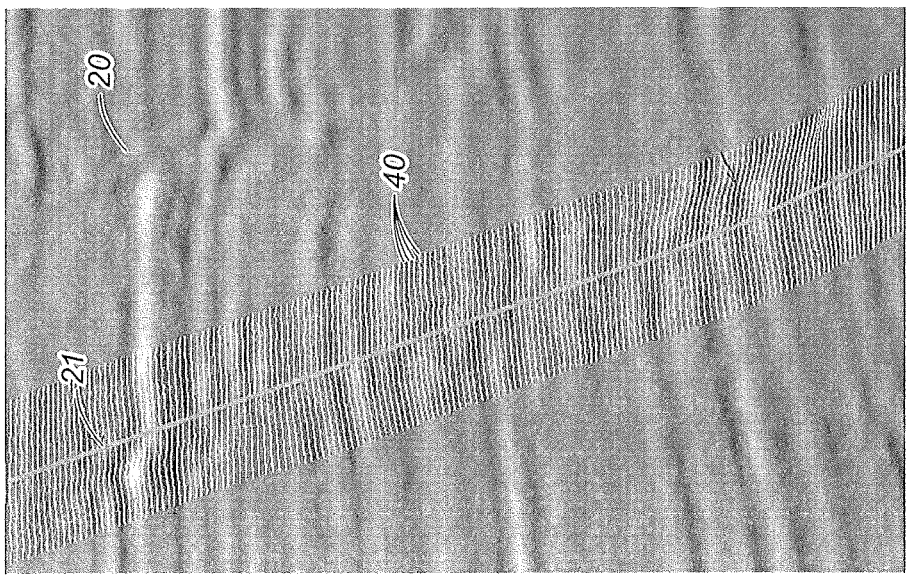
FIG. 4C is a display of the dip tracker line(s) or surface(s) illustrating step 219 in FIG. 2.
Figure 4B:
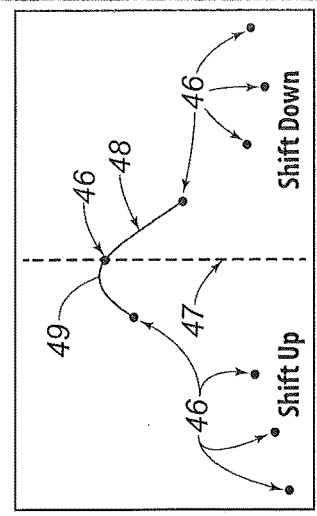
FIG. 4B is a graphical display illustrating the cross-correlation coefficients calculated in step 212 of FIG. 2 and the parabolic curve fit applied to the cross-correlation coefficients in step 213 of FIG. 2.
Figure 4A:
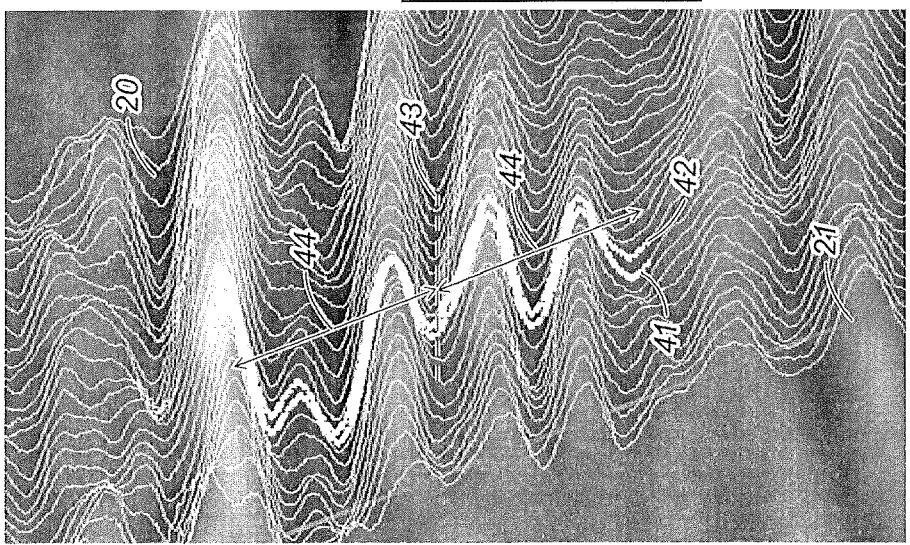
FIG. 4A is a display of the collected seismic traces and the dip tracker correlation window illustrating steps 211 and 212 in FIG. 2.

In step 212, cross-correlation coefficients for the selected seismic trace [i] with trace [i+1] for a predetermined number of vertical shifts up/down are calculated. In FIG. 4A, the calculation of the cross-correlation coefficient of a correlation window of the selected seismic trace with a correlation window of the next seismic trace over a predetermined number of vertical shifts 42 up and down is illustrated. The correlation window 44 is centered on the location where the dip is to be calculated (center line 43). The number of predetermined vertical shifts up and down must be large enough to represent the maximum dip in the application area. A typical number of four shifts covers a dip of 45 degrees (12.5 m trace spacing, 4 msec sampling and 750 m/s two-way seismic reflection velocity). The correlation windows are multiplied by an exponential weighting function to favor values close to the tracker origin:

$$w(j) = \exp(-((y_j - y_0)/y_{window})^{**2}) \quad (1)$$

with $y_0$ being the center depth, $y_j$ the depth at sample j, and $y_{window}$ the depth range of a half-window. The length of the correlation window 44 can, in principle, be short (following small stratigraphic detail) or long (following general structure). For the calculation of a clean stratigraphic seismic trace, a long correlation window is recommended to reduce the effect of local noise, migration artifacts and (real) fault drag. In practice, a correlation window of 50 to 200 samples works well. The correlation window 44 thus, is 100 samples. The number of collected seismic traces is 40 and the seismic trace gap at the seed fault 21 is 10 seismic traces. In FIG. 4B, a graphical display of the cross-correlation coefficients 46 as a function of the predetermined vertical shifts of the next seismic trace up and down, away from the center line 47 is illustrated. The correlation coefficient 46 for each shift is indicated as a point.

In step 213, a parabolic curve fit is applied to the cross-correlation coefficients 46 to obtain (a) a more accurate sub-sample shift between seismic trace [i] and seismic trace [i+1] at the location of the parabola peak; and (b) a score. In FIG. 4B, the peak 49 of the parabolic curve fit 48 indicates the optimum shift and its value is the score.

In step 214, the method 200 determines if the score is greater than a threshold (typically 0.95) and [i] is less than [n]−1. The threshold may be manually determined through the GUI as a predetermined number. If the score is not greater than the threshold and [i] is not less than [n]−1, then the method 200 proceeds to step 219. If the score is greater than the threshold and [i] is less than [n]−1, then the method 200 proceeds to step 217.

In step 217, the sub-sample shifts between seismic trace [i] and seismic trace [i+1] are accumulated.

In step 219, the accumulated sub-sample shifts are extrapolated across the seismic trace gap back to the seed fault to form a dip tracker line or surface. If the seismic trace gap is non-zero, then the mean dip shift of the seismic traces beyond the gap is extrapolated back to the seed fault. The dip line is shifted up or down in its entirety to correct for the dip line shift at the fault location. In FIG. 4C, the dip tracker lines 40 for the seismic section 20 and seed fault 21 are illustrated. The dip tracker lines 40 accurately follow the dip in the seismic section 20.

Figure 5B:
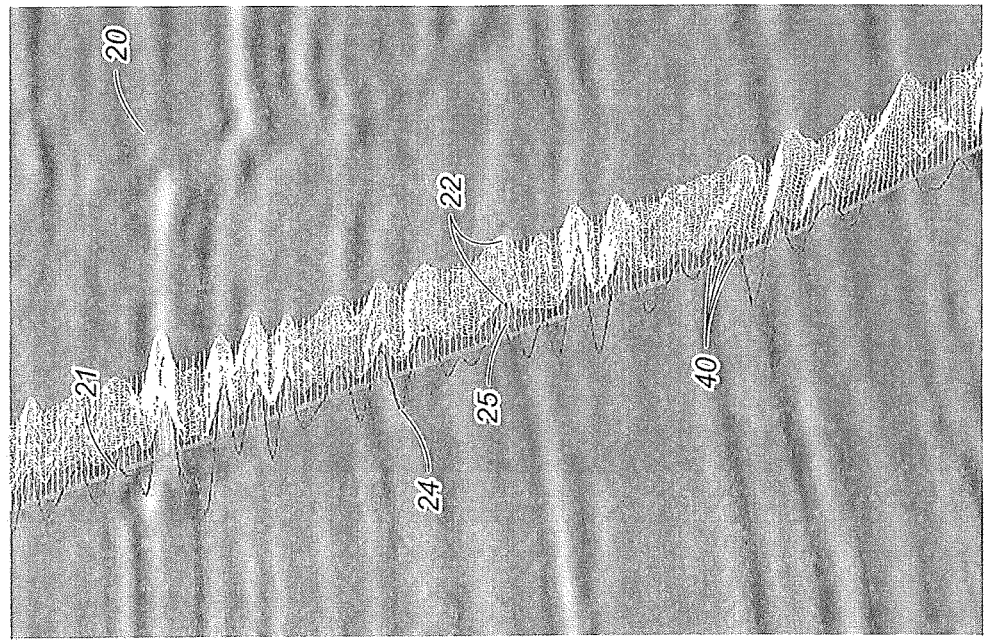
FIG. 5B is a display illustrating another clean stratigraphic seismic trace calculated in step 220 of FIG. 2 on another side of the seed fault.
Figure 5A:
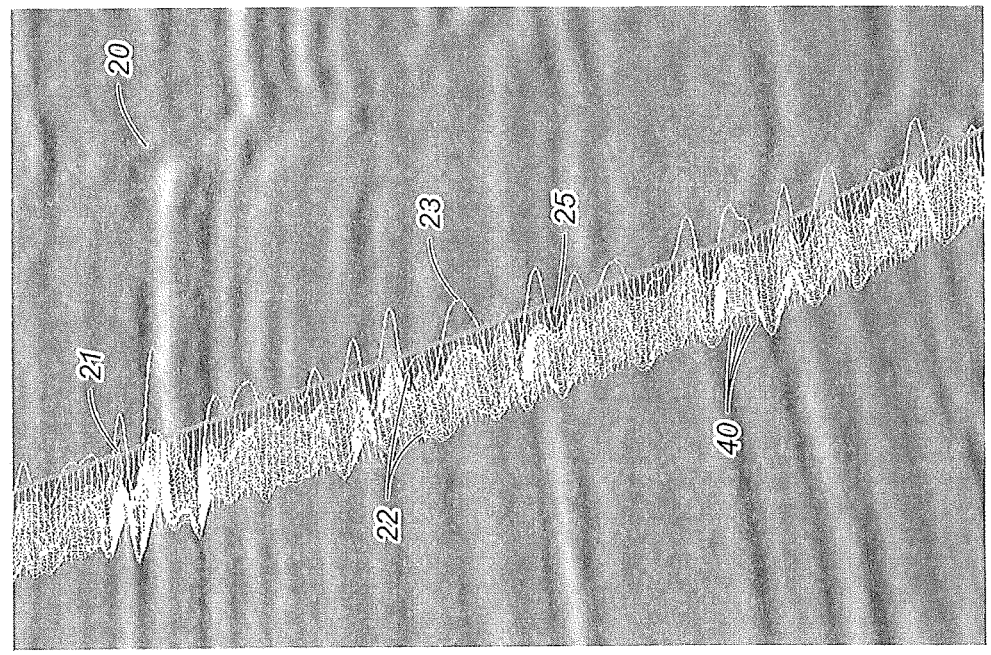
FIG. 5A is a display illustrating a clean stratigraphic seismic trace calculated in step 220 of FIG. 2 on a side of the seed fault.

In step 220, a clean stratigraphic seismic trace is calculated by stacking the collected seismic traces along the dip tracker line(s) or surface(s) on the side of the seed fault beyond the seismic trace gap. In FIG. 5A, the collected seismic traces 22 and the dip tracker lines 40 on a side of the seed fault 21 beyond the seismic trace gap 25 are illustrated. In addition, the clean stratigraphic seismic trace 23 is shown for the same side of the seed fault 21. The clean stratigraphic seismic traces are the result of stacking the collected seismic traces along the dip tracker lines (i.e. summing the collected seismic traces shifted according to the dip tracker lines). The collected seismic traces 22 close to the seed fault 21 in the seismic trace gap 25 are skipped.

In step 221, the method 200 determines whether to stop based on whether a clean stratigraphic seismic trace has been calculated on both sides of the seed fault. If a clean stratigraphic seismic trace has not been calculated on both sides of the seed fault, then the method 200 returns to step 210 to calculate another clean stratigraphic seismic trace on another side of the seed fault. If a clean stratigraphic seismic trace has been calculated on both sides of the seed fault, then the method proceeds to step 222. In FIG. 5A, the clean stratigraphic seismic trace 23 corresponds to a side (left) of the seed fault 21. And, in FIG. 5B, the clean stratigraphic seismic trace 24 corresponds to another side (right) of the seed fault 21.

In step 222, the clean stratigraphic seismic traces and collected seismic traces are returned to step 102.

Referring again to FIG. 1, the method 100 proceeds to step 103 with the clean stratigraphic seismic traces and the collected seismic traces.

Figure 6:
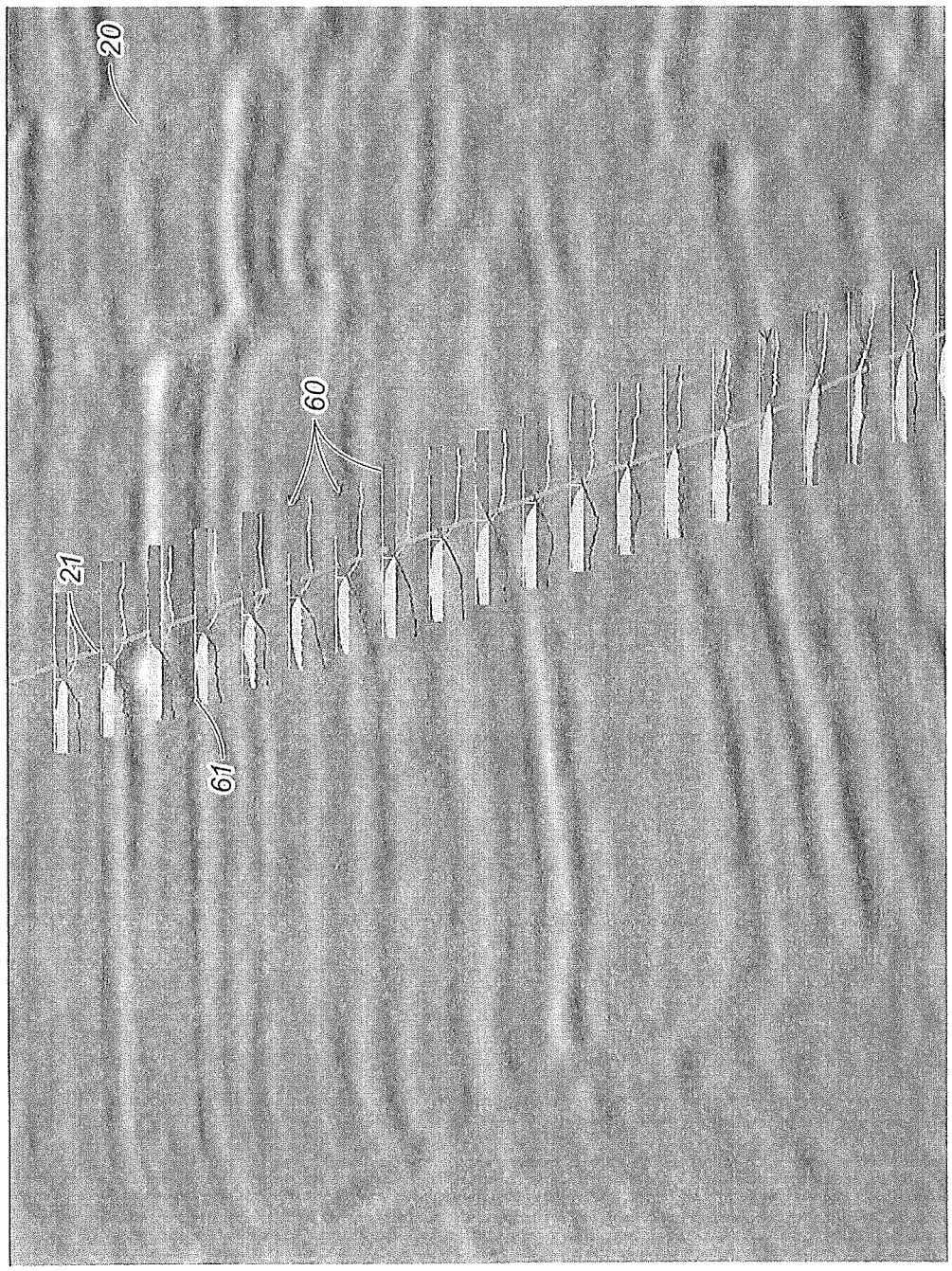
FIG. 6 is a display illustrating the fault diagnostic displays calculated in step 103 of FIG. 1.
Figure 7:
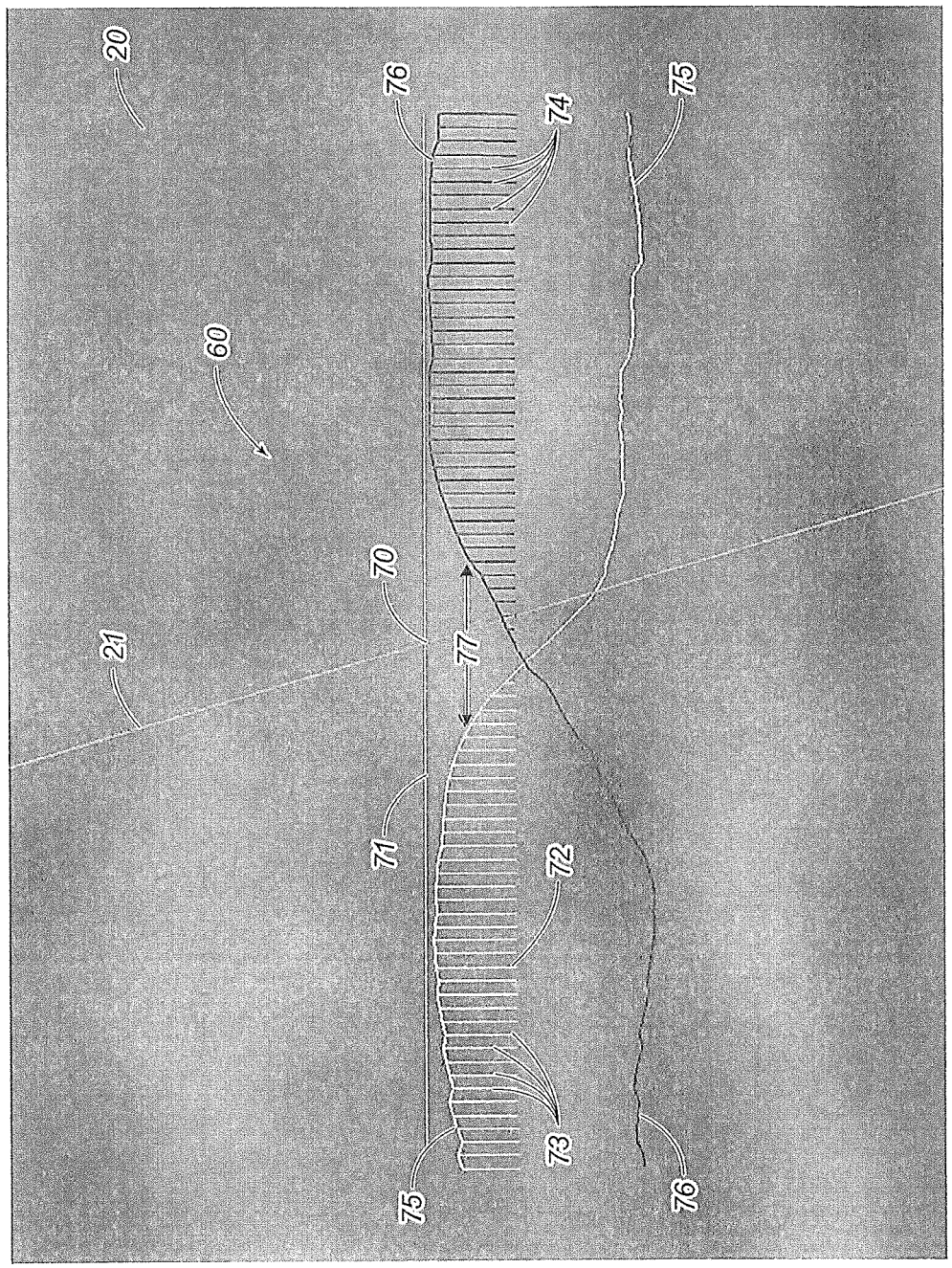
FIG. 7 is a display illustrating the details for a fault diagnostic display in FIG. 6.

In step 103, a fault diagnostic display based on a similarity between the clean stratigraphic seismic traces and the collected seismic traces is calculated. The cross-correlation coefficients between the clean stratigraphic seismic traces and the collected seismic traces in the fault diagnostic display are calculated for a single shift according to the dip tracker line(s). The clean stratigraphic seismic traces are weighted with the same exponential function used in the method 200 (step 212) for a predetermined window. Shorter windows tend to produce scattered results and longer windows tend to produce results that are too smooth to fully represent fault and seismic data variation. In FIGS. 6 and 7, the fault diagnostic displays 60 are illustrated. The fault diagnostic displays 60 each comprise cross-correlations 73 of the left-side clean stratigraphic seismic trace 23 in FIG. 5A with the collected seismic trace 22 in FIG. 5A, in yellow. The fault diagnostic displays 60 also each comprise cross-correlations 74 of the right-hand clean stratigraphic seismic trace 24 in FIG. 5B with the collected seismic traces 22 in FIG. 5B, in red. The fault diagnostic displays 60 represent a graph that may be placed on top of the seismic section. The top line 71 represents a scale line for a correlation coefficient R=1.0. The origin of the graph is where top line 71 intersects the seed fault 21 at point 70. For each collected seismic trace there is a vertical line 72 starting at R=0.5 and extending to the value of the cross-correlation coefficient of that clean stratigraphic seismic trace and the collected seismic trace(s). When this cross-correlation coefficient is less than 0.5, the vertical line 72 is suppressed. The cross-correlation lines 75 and 76 connect the cross-correlation coefficients between the collected seismic traces and the clean stratigraphic seismic trace 23 on the left and the clean stratigraphic seismic trace 24 on the right. Cross-correlation coefficients of the clean stratigraphic seismic trace on the left with the collected seismic traces on its "own" side are generally high and drop sharply across the seed fault to low values on the "opposite" side. Similarly, cross-correlation coefficients of the clean stratigraphic seismic trace on the right with the collected seismic traces on its "own" side are generally high and drop sharply across the seed fault to low values on the "opposite" side. The actual fault location will be in the hole 77 between the steps from high to low values on either side of the seed fault. The fault diagnostic displays 60 can be used to help visually assess the quality of faults. A well-defined fault will have high "own" cross-correlation coefficients and low "opposite" cross-correlation coefficients with a well-defined hole 77 inbetween. When the seismic discontinuity at the fault is not sharply defined, the hole 77 will be less well defined. When the seed fault is mis-located, the hole 77 may not coincide with the actual fault because the clean stratigraphic seismic trace calculation may have included too many seismic traces from the opposite side.

Figure 8:
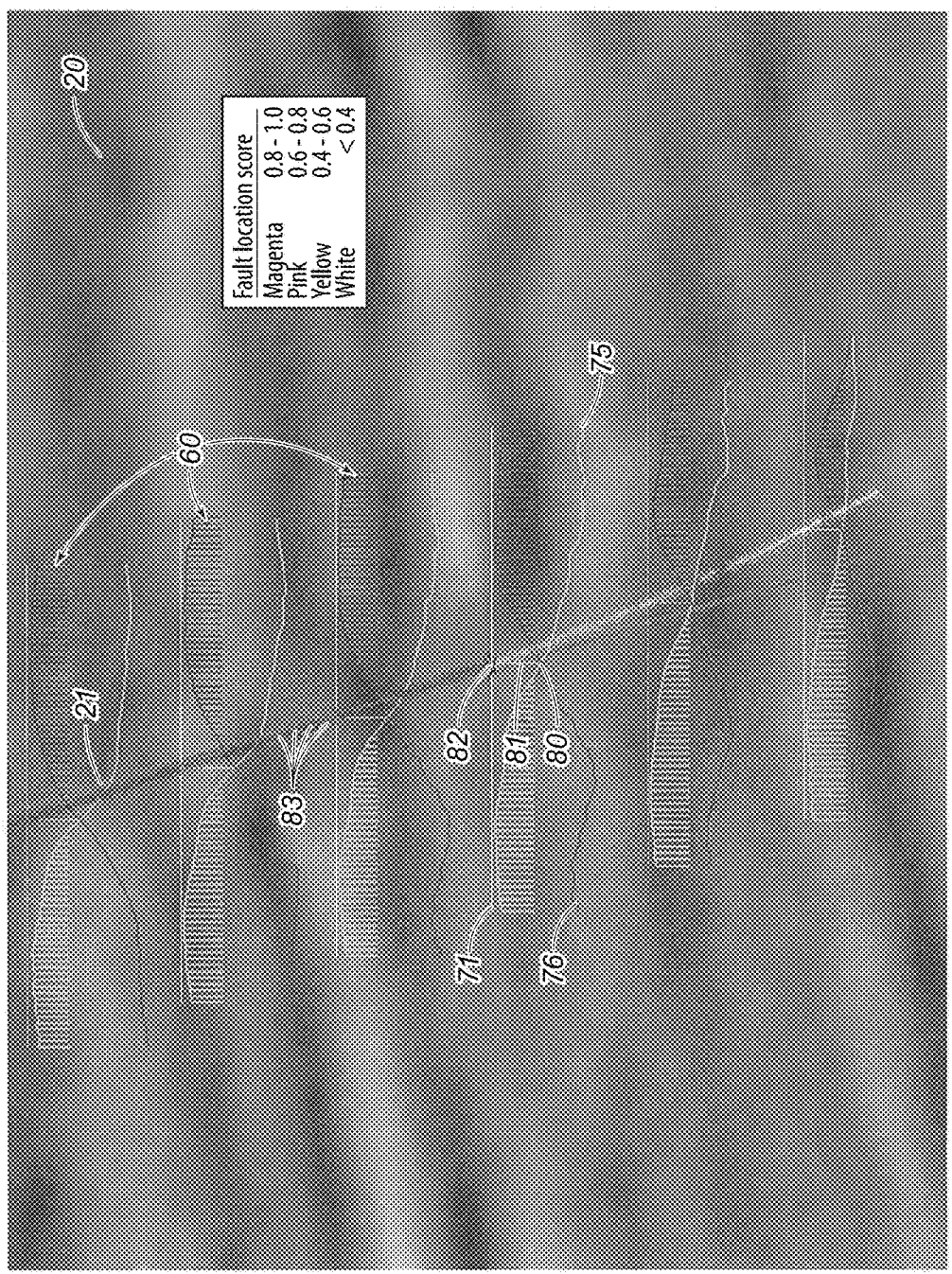
FIG. 8 is a display illustrating a diagnostic tool (enhanced fault location) calculated in step 104 of FIG. 1.
Figure 9:
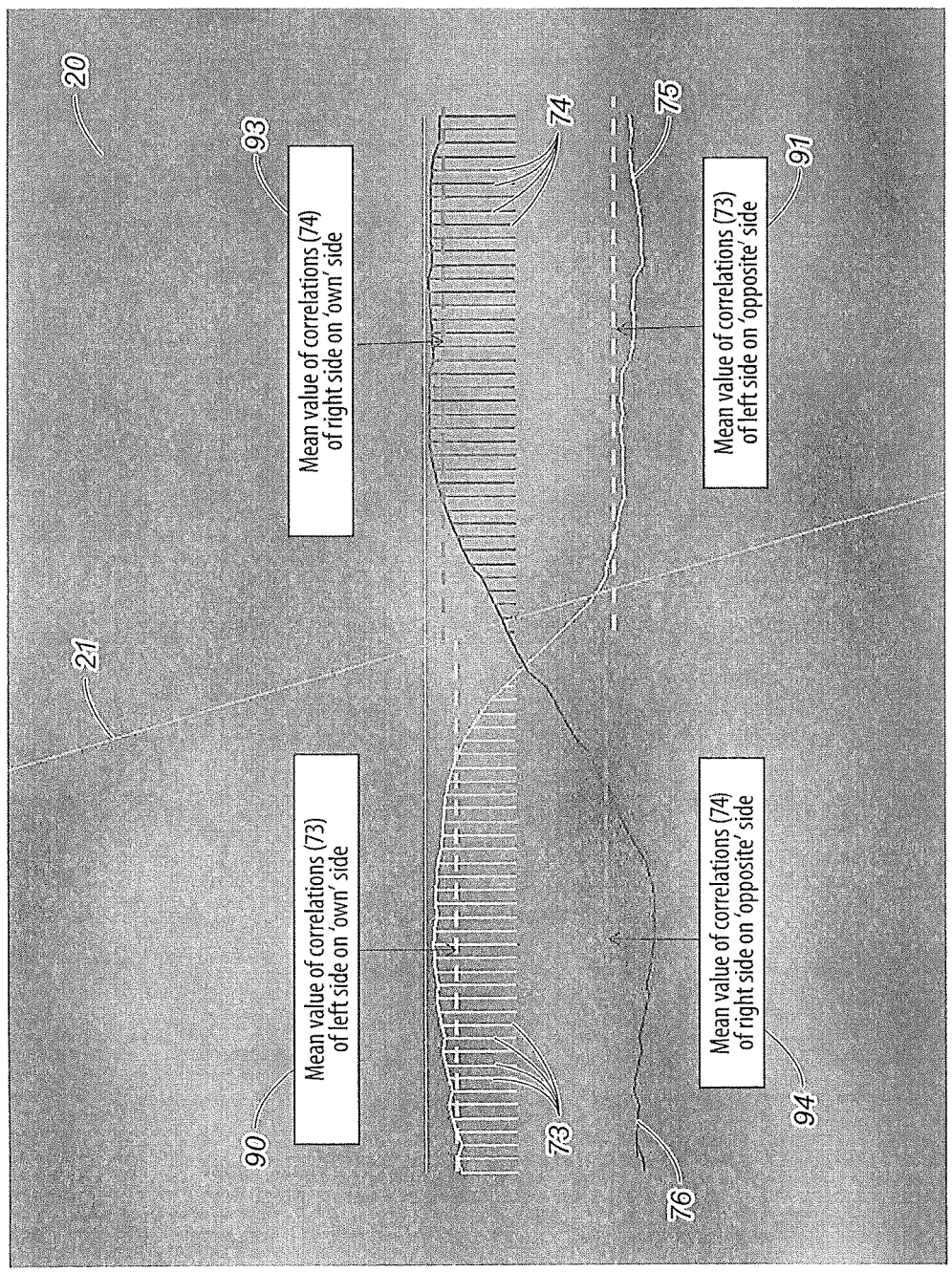
FIG. 9 is a display illustrating the calculation of a fault location score used to color code the enhanced fault location in FIG. 8.
Figure 10:
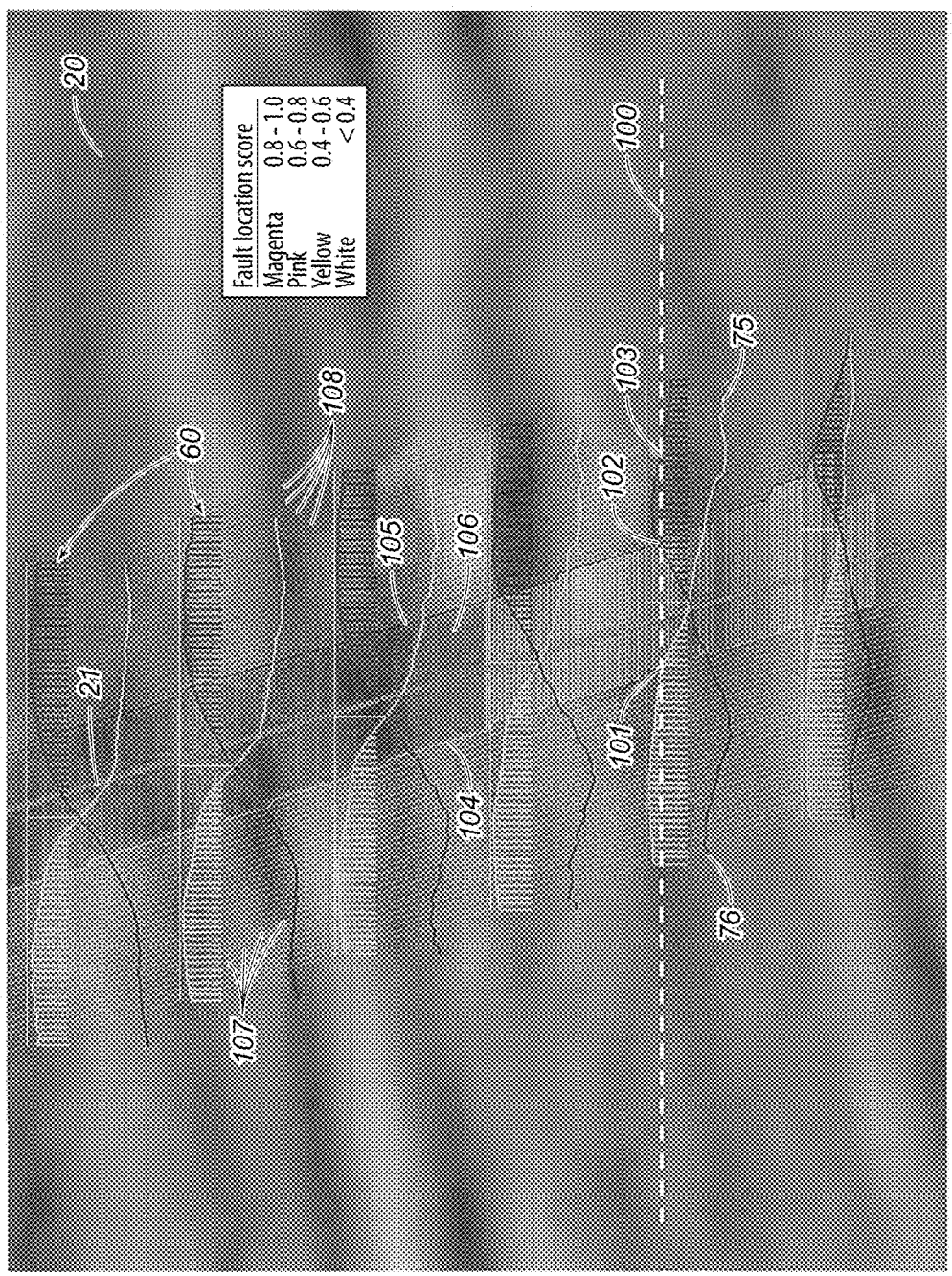
FIG. 10 is a display illustrating another diagnostic tool (fault positional uncertainty) calculated in step 104 of FIG. 1.
Figures 12A, 12B, 12C, 12D:
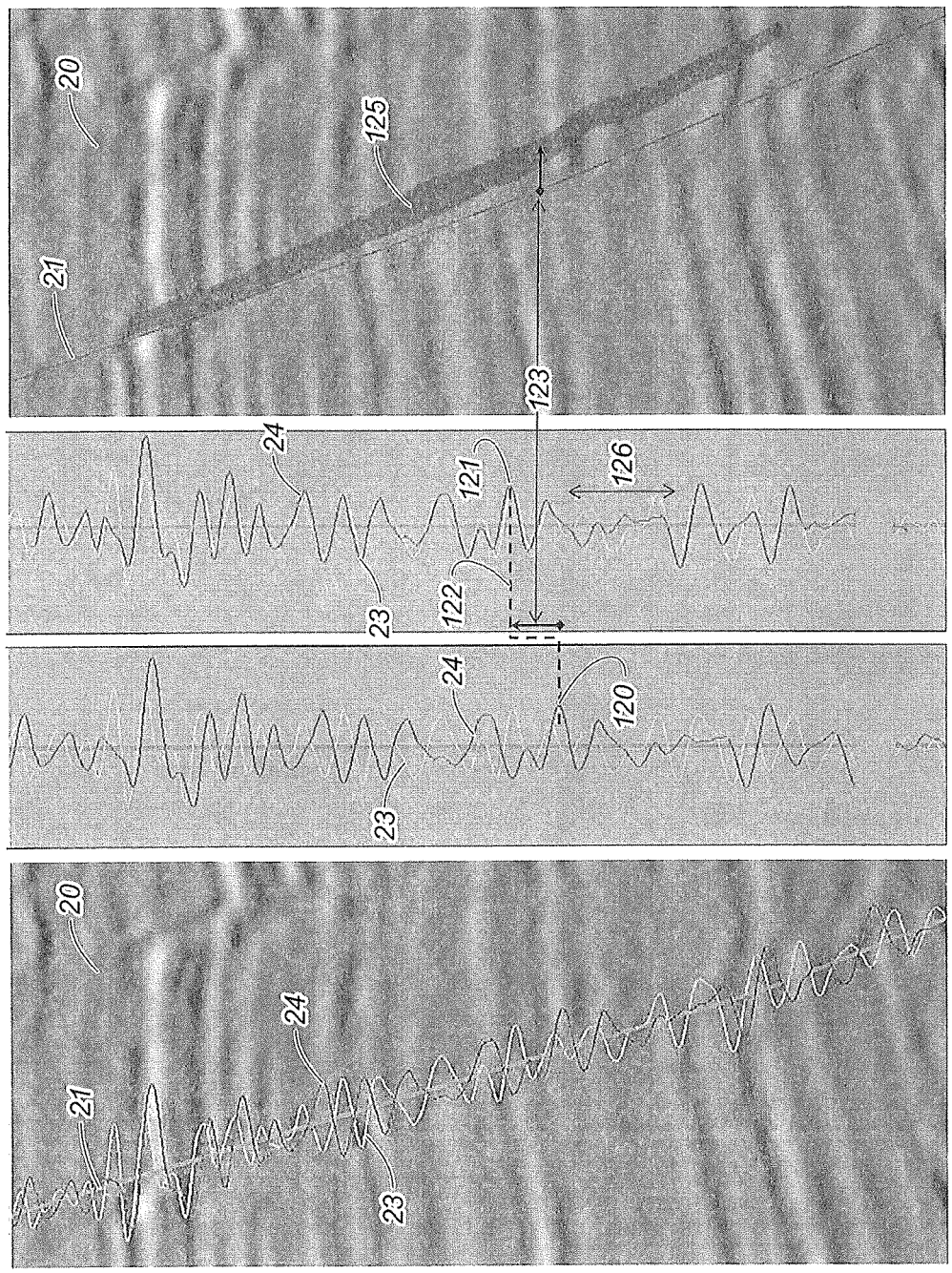
FIGS. 12A-12D are displays illustrating another diagnostic tool (fault throw) calculated in step 104 of FIG. 1.

In step 104, diagnostic tools are calculated based on the clean stratigraphic seismic traces. In FIG. 8, the calculation of an enhanced fault location (diagnostic tool) using the fault diagnostic displays 60 are illustrated. The enhanced fault location calculation begins at the point 80 where the cross-correlation line 75 intersects the cross-correlation line 76. A line 81 is drawn vertically from point 80 and the enhanced fault location is plotted at the intersection 82 of line 81 and the top line 71. The connection of each intersection 82 reveals the enhanced fault locations 83, which may be colored according to a fault location score. In FIG. 9, the calculation of the fault location score used for color coding the enhanced fault locations 83 in FIG. 8 is illustrated. The fault location score is a numerical value for the quantitative assessment of the quality of fault locations. It is based on the means of the cross-correlation coefficients between clean stratigraphic seismic traces and collected seismic traces on the "own" and "opposite" sides 90-94, which may be expressed as:

$$\text{fault location score}(i) = (m(R_{left\text{-}own,i}) - m(R_{left\text{-}opposite,i}) + m(R_{right\text{-}own,i}) - m(R_{right\text{-}opposite,i}))/2 \quad (2)$$

wherein m is the mean operator and R are the cross-correlation coefficients. The fault location score honors both a high value of the cross-correlation coefficients and a large step from the own side mean correlation to the opposite side mean correlation. In FIG. 10, the calculation of positional uncertainty of a fault (diagnostic tool) using the fault diagnostic displays 60 and the cross-correlation lines 75, 76 is illustrated. The fault positional uncertainty follows from the assumption that a fault is unlikely to be located in an area where the correlation between clean stratigraphic seismic traces and collected seismic traces is high. The left and right boundary lines of fault positional uncertainty are located where the cross-correlation lines 75, 76 cross a predetermined positional uncertainty threshold line 100 at points 101 and 102. The positional uncertainty may be displayed in three ways: i) as positional uncertainty boundary lines 104, 105; ii) as a transparent infill 106 colored according to the fault location score; and iii) as a transparent display of lines 107, 108 at the location of the collected seismic traces colored for fault side and suppressed where the cross-correlation coefficient of that collected seismic trace falls below the positional uncertainty threshold line 100. The last exemplary display is referred to as a "bank" display because it resembles a river bank. Each of the three positional uncertainty displays can be shown separately. The "own" correlation values at either end of the fault diagnostic display may also fall below the positional uncertainty threshold line 100 at point 103. This may reflect local stratigraphic variation or noise away from the fault, which creates a hole in the "bank" display. In FIGS. 11A and 11B, the fault diagnostic displays 60 at a fault tip 110 (diagnostic tool) are illustrated. The fault tip 110 is defined in structural geology as the point beyond which the throw of the fault is zero. Beyond the fault tip 110, the difference between the seismic section data on the left and right sides of the seed fault 21 or its extrapolation disappears. The step from high "own" side correlations to low "opposite" side correlations disappears close to or above the fault tip 110. Lower down, even a small throw 111 leads to significant steps and a clearly defined hole in each of the diagnostic displays 60. In FIGS. 12A-12D, the calculation of a fault throw (diagnostic tool) using the clean stratigraphic seismic traces 23, 24 is illustrated. The clean stratigraphic seismic traces 23, 24 are plotted vertically in FIG. 12B and in FIG. 12C. The clean stratigraphic seismic trace 24 is shifted relative to the other clean stratigraphic seismic trace 23 to obtain a match between the two in FIG. 12C. The vertical shift from the horizontal dashed line 120 to the horizontal dashed line 121 defines the throw 123 across the fault. The throw 123 is plotted in magenta horizontally away from the seed fault 21 in FIG. 12D. The width of the magenta throw zone 125 represents the uncertainty of the throw estimate. Short-gated cross-correlations are used for integer shifts between the two clean stratigraphic seismic traces 23, 24 as a basis for the throw calculation. The correct throw is then at a peak in the cross-correlation where the two clean stratigraphic seismic traces match as illustrated in FIG. 12C. A typical gate length is 30 samples. Due to common geological processes, the throw can vary rapidly along a fault and gate length is thereby limited. Unfortunately, the short gate length causes the peaks in the cross-correlations (as a function of shift) to be non-unique. To enhance the uniqueness of the cross-correlation peaks, a non-linear dynamic programming algorithm may be used such as, for example, the Dynamic Time Warping method. This filter is applied twice, once from top to bottom and once from bottom to top. The filter output peaks at the correct throw and the width of the peak corresponds to throw uncertainty.

Figure 20:
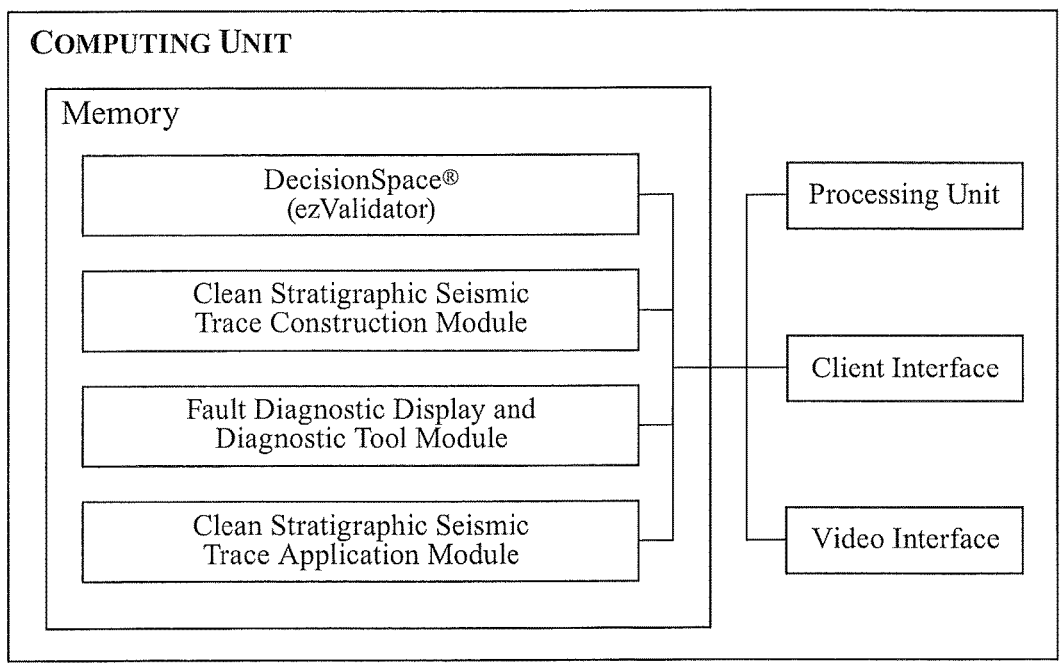
FIG. 20 is block diagram illustrating one embodiment of a computer system for implementing the present invention.

In step 105, the method 100 determines whether to select an application (fault location, fault tracking, unfaulting) based upon input using the client interface and/or the video interface described further in reference to FIG. 20. If an application should not be selected based on the input, then the method 100 ends. If an application should be selected based on the input, then the method 100 proceeds to steps 106, 107 and/or 108.

Figures 13A, 13B, 13C:
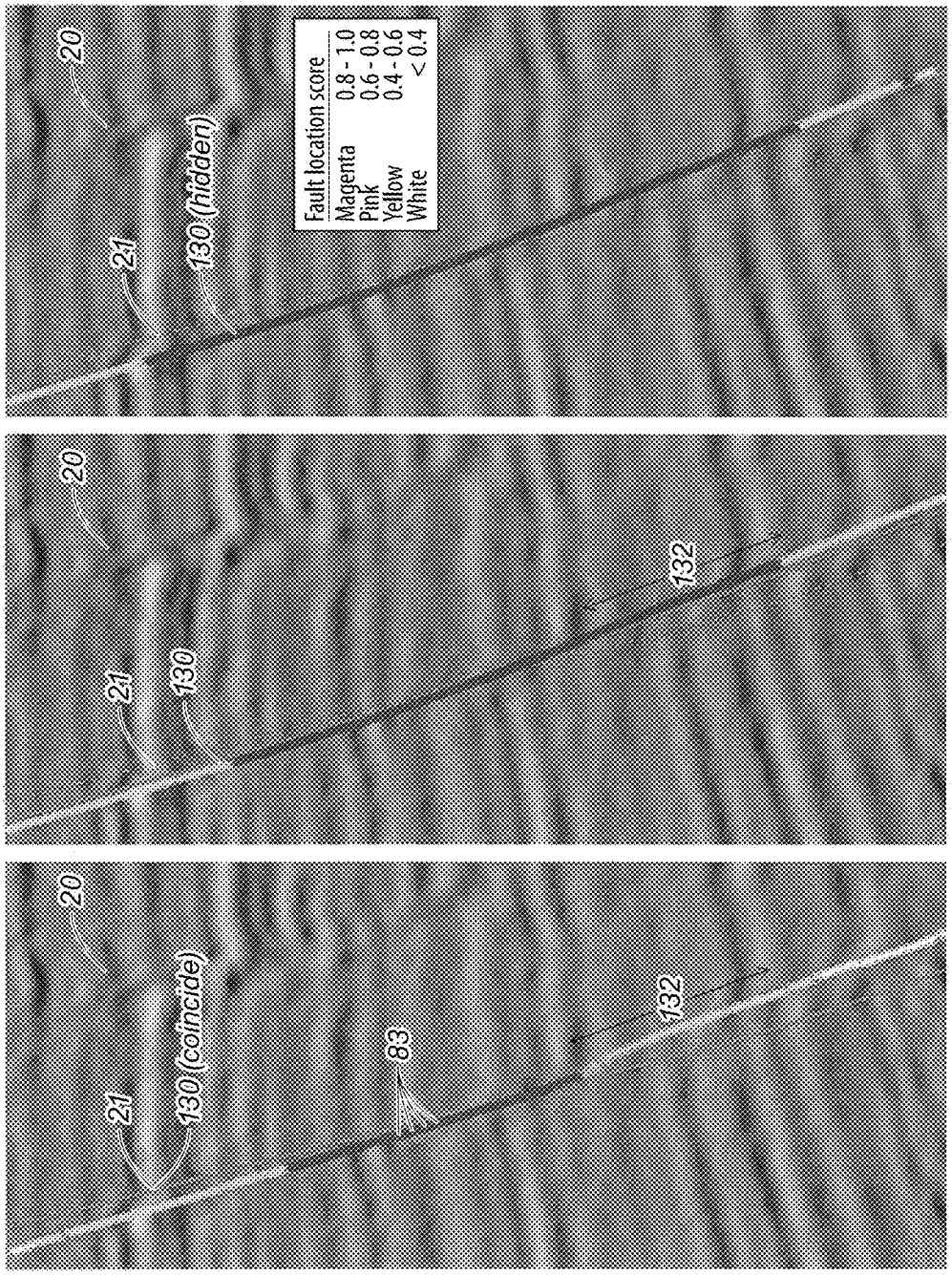
FIGS. 13A-13C are displays illustrating the results of a fault location application (fault snap) performed in step 106 of FIG. 1.
Figures 14A, 14B, 14C:
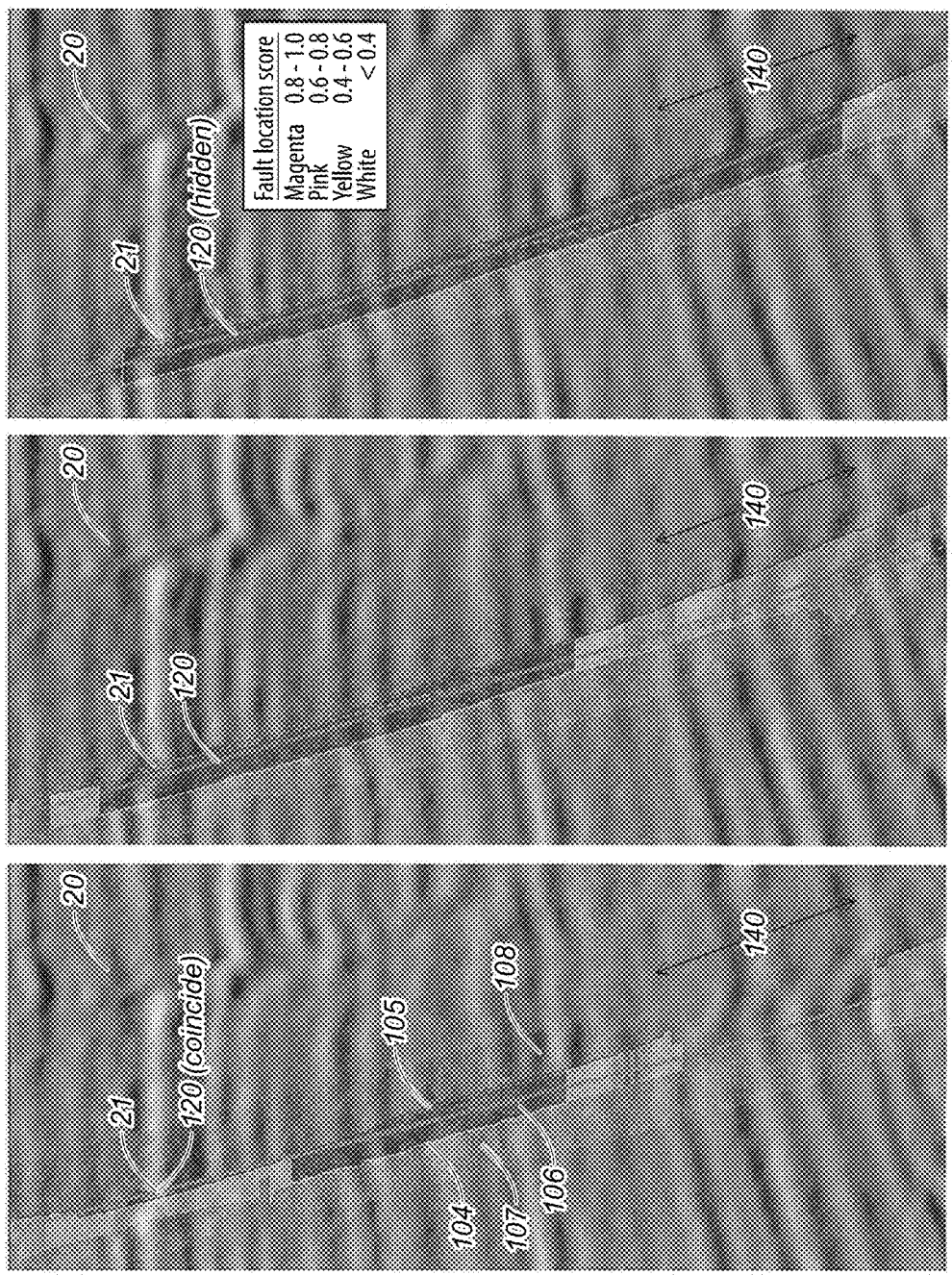
FIGS. 14A-14C are displays illustrating the results of the fault location application (fault snap) in FIGS. 13A-13C with the fault positional uncertainty in FIG. 10.

In step 106, the fault location application is performed using the clean stratigraphic seismic traces from step 102. In FIGS. 13A-13C, the results of a fault location application, also known as a fault "snap," performed in step 106 are illustrated. The seed fault 21 is replaced by the enhanced fault locations 83 calculated in step 104 and described in reference to FIG. 8. In FIG. 13A, the seed fault 21 and the enhanced fault locations 83 are shown. In FIG. 13B, the original seed fault 21 is shown as a dashed line, which is snapped to a new fault location 130. New enhanced fault locations are calculated for the new fault location 130. The fault location score in the depth region 132 changes from pink and yellow in FIG. 13A to magenta in FIG. 13B, indicating that the new location 130 is more reliable than the original seed fault 21. The new enhanced fault locations are also much closer to the new fault location 130 than the enhanced fault locations 83 in FIG. 13A. A second iteration of the fault snap is applied in FIG. 13C. The improvement in the fault location score is relatively small. The new fault location 130 is now underneath the new enhanced fault locations that are calculated for this new fault location 130. Therefore, there is no need to iterate further. The original seed fault 21 is shown as a dashed line in FIG. 13C. Reiteration of the fault snap is generally not necessary when the snap distance is less than about ⅛th of the collected seismic traces. If the snap distance is larger, then the clean stratigraphic seismic traces are contaminated by the collected seismic traces from the wrong side of the seed fault. Recalculating the clean stratigraphic seismic traces after the fault snap alleviates that. In FIGS. 14A-14F, the performance of the same fault location application (fault snap) in FIG. 13 is illustrated with the fault positional uncertainty calculated in step 104 and described in reference to FIG. 10. The region 140 shows the improvement in fault positional uncertainty when the fault is snapped from the seed fault 21 in FIG. 14A to the first iteration snap in FIG. 14B and the second iteration snap in FIG. 14C. The individual lines 107, 108 of the bank display in FIG. 10 merge into a transparent overlay in FIGS. 14A-14C. The holes in the bank display in FIG. 14A are caused by contamination of the clean stratigraphic seismic traces by seismic traces from the wrong side of the seed fault. Apart from fault interpretation, positional uncertainty can be used as numerical input to probabilistic reserve estimation procedures.

Figures 15A, 15B, 15C, 15D, 15E:
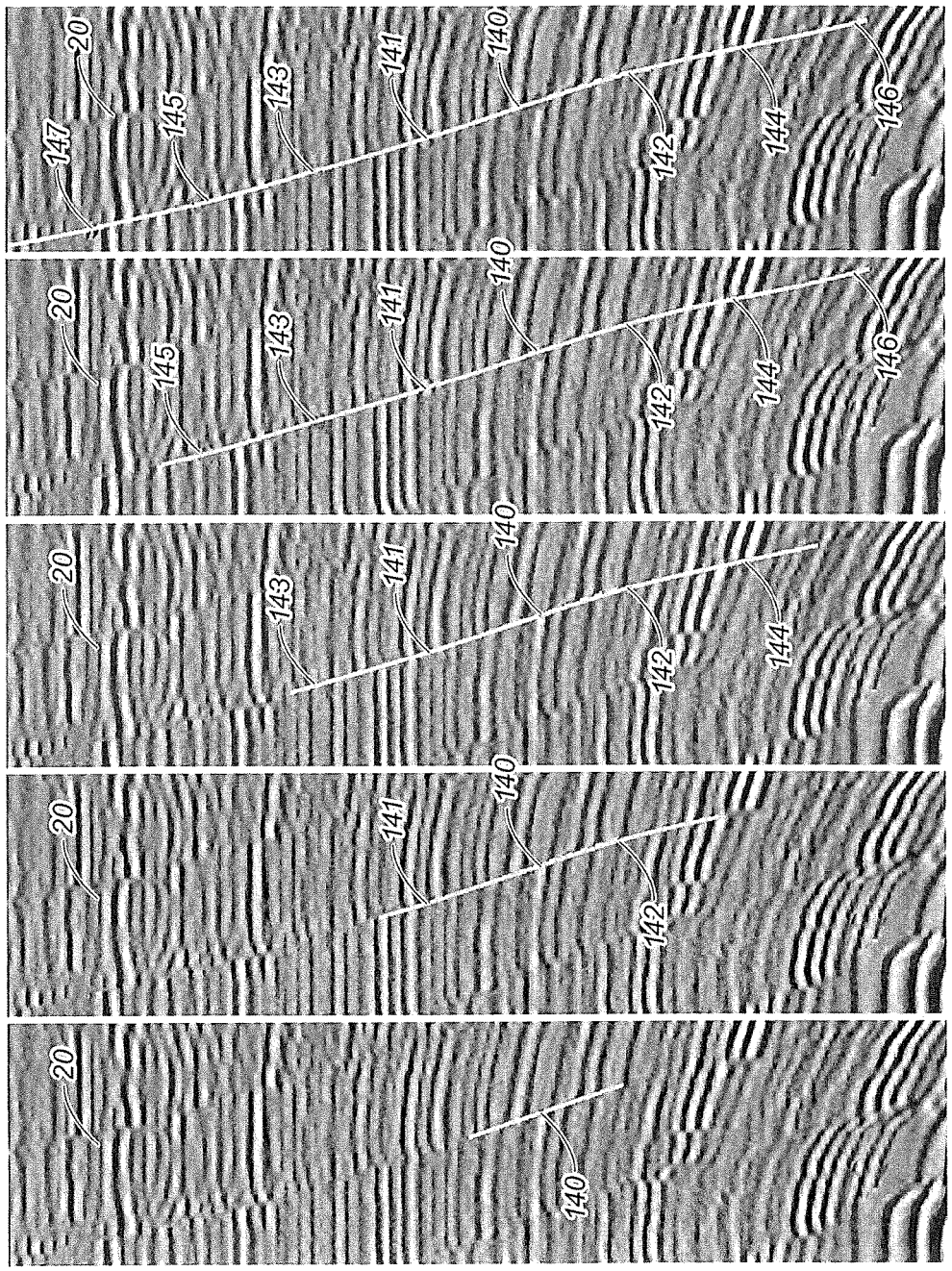
FIGS. 15A-15E are displays illustrating the results of a fault tracking application (2D snake tracker) performed in step 107 of FIG. 1.

In step 107, the fault tracking application is performed using the clean stratigraphic seismic traces from step 102. In FIGS. 15A-15E, the results of a fault tracking application, also known as the "2D snake tracker", performed in step 107 are illustrated on subsequent views of a seismic section 20. This application extends a seed fault 140 upward and downward by linear extrapolation, then it calculates the fault locations for the extrapolations from the enhanced fault location calculated in step 104 and described in reference to FIG. 8. If the fault location score of the extrapolated new locations is acceptable, then the seed fault 140 is extended on each end by extensions 141, 142 and snapped to these new locations as illustrated in FIG. 15B. This process is repeated by adding extensions 143, 144 in FIG. 15C, and extensions 145, 146 in FIG. 15D. Extension 146 is short because it ends where the extrapolated fault location score is below a user specified threshold. Upward, the fault is finally extended with extension 147 that hits the top border of the seismic section. On each extension of the seed fault, the earlier fault locations are "snapped" as well as the extrapolations. The longer seed fault allows longer windows to be used in the method 200 and in the fault diagnostic display calculated in step 103 of FIG. 1 and described in reference to FIGS. 6-7. These longer windows may considerably improve the fault location. Because of this, the fault tracking application gives the visual impression of a sinuous snake-like movement finding the cracks in a wall. The fault tip calculation described in reference to FIG. 11A and FIG. 11B is used to stop unwarranted extensions of a fault by the fault tracking application. It can also be used to cut back the extent (shrinking) of earlier hand-interpreted faults, or of faults from an automatic fault tracking procedure in a consistent manner. In FIGS. 16A-16E, the results of another fault tracking application, also known as the "3D snake tracker", performed in step 107 are illustrated on adjacent seismic sections 160-164 using simulated data. It starts with a seed fault 165 in FIG. 16A, which is projected onto the next section represented as a dashed line 166 in FIG. 16B. This fault is "snapped" to a new location in the same manner described in reference to FIGS. 13A-13C. The new fault is then, in turn, projected onto the next section in FIG. 16C and snapped again. This is repeated until the fault location score is unacceptable. For this application to work, the fault plane cannot be parallel to the sections. In practice a minimum angle of 30°-45° is required. The procedure works on arbitrarily oriented sections, and the sections need not be exactly parallel. The fault projection can be orthogonal between sections if there is one seed fault interpreted on one seismic section. When there are more seed faults interpreted or tracked, a 3D fault plane can be generated and extrapolated. Collecting seismic traces on adjacent sections in 3D seismic data may improve the signal to noise ratio in the clean stratigraphic seismic traces, and thereby improve the location calculations in the 3D snake tracker. The 3D snake tracker can be applied globally, tracking as far as the fault location score allows, or locally over a limited set of seismic sections away from the seed fault.

Figure 19B:
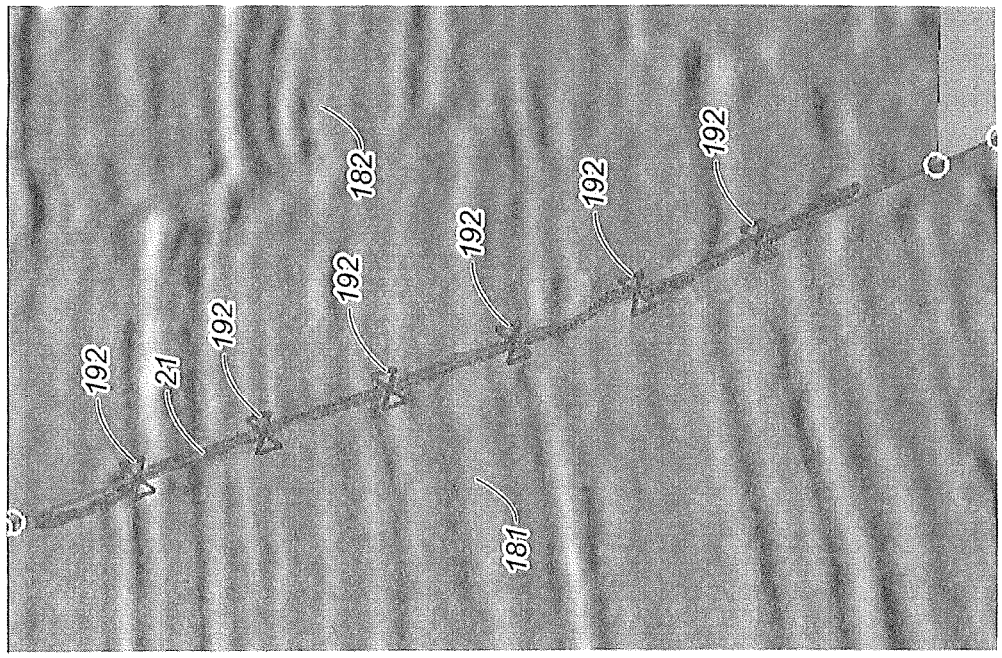
FIGS. 19A-19B are displays illustrating the results of another unfaulting application automatically performed in step 108 of FIG. 1 based on the fault throw calculation in FIGS. 12A-12D.
Figure 19A:
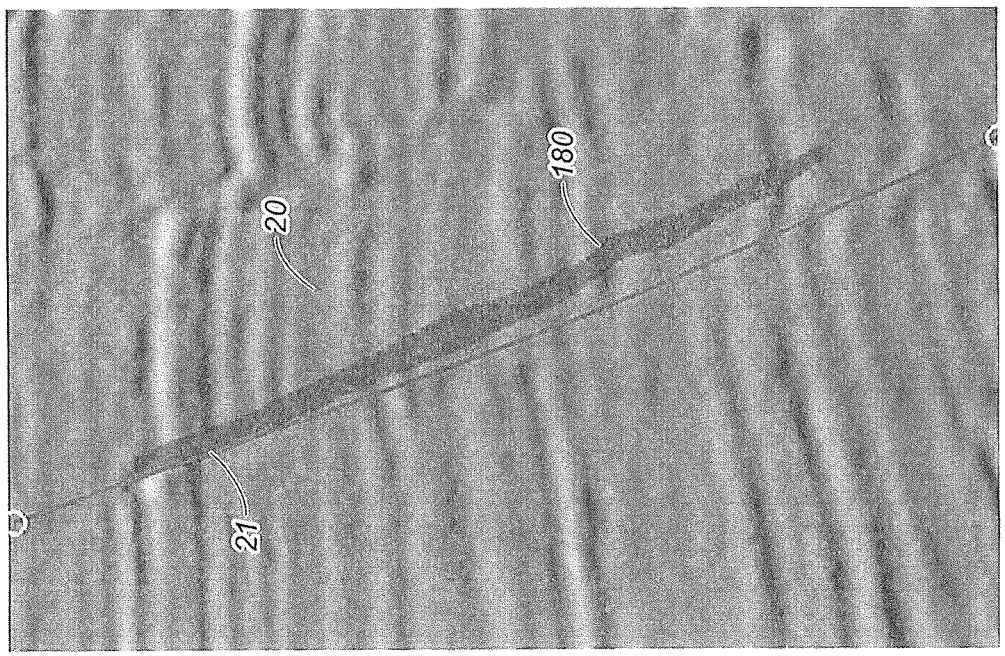

In step 108, the unfaulting application is performed using the clean stratigraphic seismic traces from step 102. The unfaulting application helps in establishing good correlations in the technique known as unfaulting, which may be implemented within the ezValidator™ software owned by Landmark Graphics Corporation. The unfaulted seismic section and the matching clean stratigraphic seismic traces are good validation tools for fault interpretation and provide a view of the stratigraphic variation across the fault. In FIGS. 17A-17E, the results of an unfaulting application manually performed in step 108 are illustrated on subsequent views of seismic section 20. The clean stratigraphic seismic traces are used directly as quality assurance of the unfaulting technique. In FIG. 17A, the clean stratigraphic seismic traces 170, 171 are similar, but displaced in depth according to the fault throw. In FIG. 17B, on placing an unfaulting anchor 172 in ezValidator, and dragging and dropping the seismic data on the right side, the clean stratigraphic seismic trace 171 is dragged along with the seismic data until it coincides with the clean stratigraphic seismic trace 170 around the unfaulting anchor 172. In FIG. 17C a second unfaulting anchor 173 is placed and again the seismic data is dragged-and-dropped until the clean stratigraphic seismic traces match around the second unfaulting anchor 173. This procedure is repeated for the third unfaulting anchor 174 in FIG. 17D and the fourth unfaulting anchor 175 in FIG. 17E. In FIG. 17E, a good match between the clean stratigraphic seismic traces 170, 171 is obtained, reflecting the match of seismic patterns across the fault after unfaulting. Matching the clean stratigraphic seismic traces in this manner is used together with matching the seismic character. The clean stratigraphic seismic traces may help in obtaining improved accuracy of the unfaulting displacements (anchors). In FIGS. 18A-18E, the results of another unfaulting application manually performed in step 108 are illustrated on subsequent views of seismic section 20. Here, the throw display is another visual quality-control tool for the unfaulting application. In FIG. 18A, the throw 180 is plotted horizontally away from the fault line to indicate the result of the throw calculation. In FIG. 18B, on placing an unfaulting anchor 172 at the top, the throw 180 close to the unfaulting anchor 172 moves to a position right under the fault line, indicating that this correlation is correct and that it has zero residual throw. On placing a second unfaulting anchor 173 and a third unfaulting anchor 174 in FIGS. 18C and 18D, respectively, the throw 180 does the same at each step. But, more importantly, the overall width of the throw 180 diminishes to indicate that the throw uncertainty is getting smaller. Toward the end in FIG. 18E, the throw 180 is completely hiding behind the seed fault 21, indicating that there is no residual throw. In FIGS. 19A-19B, the results of another unfaulting application automatically performed in step 108 are illustrated on two views of seismic section 20. Here the throw 180 is used directly to shift one side 182 of the seismic data relative to the other side 181 by placing evenly distributed anchors 192 along the seed fault 21 and applying the calculated throw inversely for shifting each anchor. This gives a match of the seismic pattern that may be more detailed and accurate than the match obtained from the manual procedure described in reference to FIGS. 17 and 18. Automatic unfaulting may cut back time and effort involved in validating fault interpretations and forms a basis for numerical fault quality assessment tools based on fault throw. Automatic unfaulting with horizon tracking allows a horizon tracker to jump across faults.

In the repetitive procedure applied by a seismic interpreter or a field geologist to interpret a fault, the geological characteristics (lithology, stratigraphy) of the displaced blocks on either side of the fault are characterized visually or in the form of a wireline well log. The two characterizations on either side of the fault are then compared to pinpoint the location of the fault and to determine its offset. A fault without offset is generally not referred to as a fault but rather, is described as a crack or a fracture. The clean stratigraphic seismic traces from step 102 in FIG. 1 may be used like the above characterizations.

The clean stratigraphic seismic traces are extracted from the seismic data and processed specifically to improve their reliability and lower their signal-to-noise ratio as much as possible. In 3D seismic data, such signal processing may produce better results than in 2D because there is more statistical information available to identify signal and to identify noise.

The clean stratigraphic seismic traces also allow diagnostic tools such as fault location score and positional uncertainty to be calculated. These diagnostic tools can be used as an overlay display on the seismic section and on the fault-enhanced volumes during fault interpretation. Their numerical values can be used to steer an interpretation workflow (bad faults needing more time and attention), or in the assessment of hydrocarbon reserves. Enhanced fault locations are another diagnostic tool that may be calculated from the local similarity of the clean stratigraphic seismic traces and the original seismic traces parallel to the seed fault.

2D and 3D fault tracking applications have also been realized based on the repeated extrapolation of the seed fault followed by calculation of the enhanced fault locations. These are referred to as the "snake trackers." These fault tracking applications are based on fault-specific long-gate noise reducing processing. The resulting faults are more robust than those derived from automatic fault extraction methods obtained from general short-gate processed fault-enhanced volumes.

The clean stratigraphic seismic trace overlay and the fault throw can be used as quality controls on the interpretation process known as unfaulting.

System Description

The present invention may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace®, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, and/or through any of a variety of networks, such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 20, a block diagram illustrates one embodiment of a system for implementing the present invention on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-19. The memory therefore, includes a clean stratigraphic seismic trace construction module, which enables the methods described in reference to step 102 in FIG. 1. The memory also includes a fault diagnostic display and diagnostic tool module, which enables the methods described in reference to steps 103-104 in FIG. 1. The memory further includes a clean stratigraphic seismic trace application module, which enables the methods described in reference to steps 105-108 in FIG. 1. The foregoing modules may integrate functionality from the remaining application programs illustrated in FIG. 20. In particular, DecisionSpace® may be used as an interface application to perform one or more steps in FIG. 1. Although DecisionSpace® may be used as an interface application, other interface applications may be used, instead, or each module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

What is claimed is:

1. A computer implemented method, comprising:
    a) selecting, by a processor, a first seismic trace beyond a seismic trace gap from a plurality of seismic traces collected parallel to a side of a seed fault;
    b) calculating, by the processor, cross-correlation coefficients for the selected first seismic trace with a next seismic trace for a predetermined number of vertical shifts up and down;
    c) applying, by the processor, a parabolic curve fit to each cross-correlation coefficient to generate I) a sub-sample shift between the selected first seismic trace and the next seismic trace, and II) a score determined using a value of a peak of a parabola generated based on the parabolic curve fit;
    d) accumulating, by the processor, the sub-sample shift(s) between the selected first seismic trace and the next seismic trace;
    e) selecting, by the processor, the next seismic trace beyond the seismic trace gap from the plurality of collected seismic traces;
    f) repeating, by the processor, steps b) through e) for each remaining seismic trace of the plurality of collected seismic traces until the score is less than or equal to a predetermined threshold and there are no more seismic traces in the plurality of collected seismic traces, and wherein the score becoming less than or equal to the predetermined threshold is an indication that an optimum shift has been determined;
    g) extrapolating, by the processor, the accumulated sub-sample shifts across the seismic trace gap back to the seed fault to form a line or a surface on the side of the seed fault and beyond the seismic trace gap;
    h) transforming, using the processor, the plurality of collected seismic traces into a clean stratigraphic seismic trace, the transformation including overlapping at least two collected seismic traces of the plurality of collected seismic traces, the at least two collected seismic traces being overlapped along the line or surface of the seed fault, and the overlapping causing a transparent overlay to be generated;
    i) displaying a fault diagnostic display on a screen, the fault diagnostic display including the clean stratigraphic seismic trace and the transparent overlay, the displayed transparent overlay replacing the seed fault with a new fault location of one or more geological faults, the new fault location enhancing a visibility of the one or more geological faults displayed on the screen by reducing a positional uncertainty of the one or more geological faults, wherein the transformation by the processor causes the clean stratigraphic seismic trace to have a lower signal-to-noise ratio than the plurality of seismic traces collected; and j) displaying a wireline well log using the clean stratigraphic seismic trace.

2. The method of claim 1, further comprising repeating steps a) through i) for another plurality of seismic traces collected on another side of the seed fault.

3. The method in claim 2, further comprising calculating a fault diagnostic display based on a similarity between the clean stratigraphic seismic traces and the respective plurality of collected seismic traces.

4. The method of claim 3, wherein the fault diagnostic display comprises cross-correlation coefficients calculated between each clean stratigraphic seismic trace and each respective plurality of collected seismic traces, and cross-correlation lines that connect the cross-correlation coefficients between each plurality of collected seismic traces and each respective clean stratigraphic seismic trace.

5. The method of claim 4, further comprising positioning the fault diagnostic display over a seismic section to determine a seed fault quality.

6. The method of claim 1, further comprising calculating a diagnostic tool based on each clean stratigraphic seismic trace.

7. The method of claim 6, wherein the diagnostic tool represents a fault tip that is displayed at a point on the seed fault beyond which a throw of the seed fault is zero.

8. The method of claim 6, wherein the diagnostic tool represents a fault throw that is displayed with a quality code based on an uncertainty of the fault throw.

9. The method of claim 6, wherein the diagnostic tool represents an enhanced fault location that is displayed using a code based on a fault location score.

10. The method of claim 9, further comprising performing a fault tracking application using each clean stratigraphic seismic trace, wherein the seed fault is projected in 3D forward and backward onto adjacent seismic sections by linear extrapolation or interpolation and a location for each projection of the seed fault is calculated from the enhanced fault location.

11. The method of claim 9, further comprising performing a fault tracking application using each clean stratigraphic seismic trace, wherein the seed fault is extended in 2D up and down within a seismic section by linear extrapolation and a location for each extrapolated extension is calculated from the enhanced fault location.

12. The method of claim 9, wherein the diagnostic tool represents a positional uncertainty for the seed fault that is displayed as one of positional uncertainty boundary lines, a transparent infill coded according to the fault location score or a bank of transparent lines at a location of each of the plurality of collected seismic traces.

13. The method of claim 12, further comprising performing a fault location application using each clean stratigraphic seismic trace, wherein the seed fault is replaced by each enhanced fault location and is displayed with the positional uncertainty for the seed fault.

14. The method of claim 1, wherein the seed fault is a 2D line or a 3D surface.

15. The method of claim 1, further comprising performing an unfaulting application using each clean stratigraphic seismic trace to guide manual unfaulting and obtain a closer match between each clean stratigraphic seismic trace.

16. The method of claim 1, further comprising performing an unfaulting application using each clean stratigraphic seismic trace and a throw calculation for the seed fault to guide manual unfaulting.

17. The method of claim 1, further comprising performing an unfaulting application using each clean stratigraphic seismic trace and a throw calculation for the see fault to guide automatic unfaulting.

18. A non-transitory program carrier device tangibly carrying computer executable instructions for creating clean stratigraphic seismic traces, the instructions being executable to implement:

a) selecting a first seismic trace beyond a seismic trace gap from a plurality of seismic traces collected parallel to a side of a seed fault;

b) calculating cross-correlation coefficients for the selected first seismic trace with a next seismic trace for a predetermined number of vertical shifts up and down;

c) applying a parabolic curve fit to each cross-correlation coefficient to generate I) a sub-sample shift between the selected first seismic trace and the next seismic trace, and II) a score determined using a value of a peak of a parabola generated based on the parabolic curve fit;

d) accumulating the sub-sample shift(s) between the selected seismic trace and the next seismic trace;

e) selecting the next seismic trace beyond the seismic trace gap from the plurality of collected seismic traces;

f) repeating steps b) through e) for each remaining seismic trace of the plurality of collected seismic traces until the score is less than or equal to a predetermined threshold and there are no more seismic traces in the plurality of collected seismic traces, and wherein the score becoming less than or equal to the predetermined threshold is an indication that an optimum shift has been determined;

g) extrapolating, by a processor, the accumulated sub-sample shifts across the seismic trace gap back to the seed fault to formula line or a surface, on the side of the seed fault and beyond the seismic trace gap;

h) transforming, using the processor, the plurality of collected seismic traces into a clean stratigraphic seismic trace, the transformation including overlapping at least two collected seismic traces of the plurality of collected seismic traces, the at least two collected seismic traces being overlapped along the line or surface of the seed fault, and the overlapping causing a transparent overlay to be generated;

i) displaying a fault diagnostic display on a screen, the fault diagnostic display including a clean stratigraphic seismic trace and the transparent overlay, the transparent overlay replacing the seed fault with a new fault location of one or more geological faults, the new fault location enhancing a visibility of the one or more geological faults displayed on the screen by reducing a positional uncertainty of the one or more geographical faults, wherein the transformation by the processor causes the clean stratigraphic seismic trace to have a lower signal-to-noise ratio than the plurality of seismic traces collected; and j) displaying a wireline well log using the clean stratigraphic seismic trace.

19. The program carrier device of claim 18, further comprising repeating steps a) through i) for another plurality of seismic traces collected on another side of the seed fault.

20. The program carrier device of claim 19, further comprising calculating a fault diagnostic display based on a similarity between the clean stratigraphic seismic traces and the respective plurality of collected seismic traces.

21. The program carrier device of claim 20, wherein the fault diagnostic display comprises cross-correlation coefficients calculated between each clean stratigraphic seismic trace and each respective plurality of collected seismic traces, and cross-correlation lines that connect the cross-correlation coefficients between each plurality of collected seismic traces and each respective clean stratigraphic seismic trace.

22. The program carrier device of claim 21, further comprising positioning the fault diagnostic display over a seismic section to determine a seed fault quality.

23. The program carrier device of claim 18, further comprising calculating a diagnostic tool based on each clean stratigraphic seismic trace.

24. The program carrier device of claim 23, wherein the diagnostic tool represents a fault throw that is displayed with a quality code based on an uncertainty of the fault throw.

25. The program carrier device of claim 23, wherein the diagnostic tool represents a fault tip that is displayed at a point on the seed fault beyond which a throw of the seed fault is zero.

26. The program carrier device of claim 23, wherein the diagnostic tool represents an enhanced fault location that is displayed using a code based on a fault location score.

27. The program carrier device of claim 26, further comprising performing a fault tracking application using each clean stratigraphic seismic trace, wherein the seed fault is projected in 3D forward and backward onto adjacent seismic sections by linear extrapolation or interpolation and a location for each projection of the seed fault is calculated from the enhanced fault location.

28. The program carrier device of claim 26, further comprising performing a fault tracking application using each clean stratigraphic seismic trace, wherein the seed fault is extended in 2D up and down within a seismic section by linear extrapolation and a location for each extrapolated extension is calculated from the enhanced fault location.

29. The program carrier device of claim 26, wherein the diagnostic tool represents a positional uncertainty for the seed fault that is displayed as one of positional uncertainty boundary lines, a transparent infill coded according to the fault location score or a bank of transparent lines at a location of each of the plurality of collected seismic traces.

30. The program carrier device of claim 29, further comprising performing a fault location application using each clean stratigraphic seismic trace, wherein the seed fault is replaced by each enhanced fault location and is displayed with the positional uncertainty for the seed fault.

31. The program carrier device of claim 18, further comprising performing an unfaulting application using each clean stratigraphic seismic trace to guide manual unfaulting and obtain a closer match between each clean stratigraphic seismic trace.

32. The program carrier device of claim 18, further comprising performing an unfaulting application using each clean stratigraphic seismic trace and a throw calculation for the seed fault to guide manual unfaulting.

33. The program carrier device of claim 18, further comprising performing an unfaulting application using each clean stratigraphic seismic trace and a throw calculation for the see fault to guide automatic unfaulting.

34. The program carrier device of claim 18, wherein the seed fault is a 2D line or a 3D surface.

35. A non-transitory program carrier device tangibly carrying computer executable instructions for creating clean stratigraphic seismic traces, the instructions being executable to implement:
   a) selecting a first seismic trace beyond a seismic trace gap from a plurality of seismic traces collected parallel to a side of a seed fault;
   b) calculating cross-correlation coefficients for the selected first seismic trace with a next seismic trace for a predetermined number of vertical shifts up and down;
   c) applying a parabolic curve fit to each cross-correlation coefficient to generate I) a sub-sample shift between the selected first seismic trace and the next seismic trace, and II) a score determined using a value of a peak of a parabola generated based on the parabolic curve fit;
   d) accumulating the sub-sample shift(s) between the selected seismic trace and the next seismic trace;
   e) selecting the next seismic trace beyond the seismic trace gap from the plurality of collected seismic traces;
   f) repeating steps b) through e) for each remaining seismic trace of the plurality of collected seismic traces until the score is less than or equal to a predetermined threshold and there are no more seismic traces in the plurality of collected seismic traces, and wherein the score becoming less than or equal to the predetermined threshold is an indication that an optimum shift has been determined;
   g) extrapolating, by a processor, the accumulated sub-sample shifts across the seismic trace gap back to the seed fault to form a line or a surface;
   h) transforming, using the processor, the plurality of collected seismic traces into a clean stratigraphic seismic trace, the transformation including overlapping at least two collected seismic traces of the plurality of collected seismic traces, the at least two collected seismic traces being overlapped along the line or surface of the seed fault, and the overlapping causing a transparent overlay to be generated;
   i) displaying a fault diagnostic display on a screen, the fault diagnostic display including a clean stratigraphic seismic trace and the transparent overlay, the transparent overlay replacing the seed fault with a new fault location of one or more geological faults, the new fault location enhancing a visibility of the one or more geological faults displayed on the screen by reducing a positional uncertainty of the one or more geological faults, wherein the transformation by the processor causes the clean stratigraphic seismic trace to have a lower signal-to-noise ratio than the plurality of seismic traces collected;
   j) repeating steps a) through i) for another plurality of seismic races collected on another side of the seed fault; and
   (k) displaying a wireline well log using the clean stratigraphic seismic trace.

36. The program carrier device of claim 35, wherein the seed fault is a 2D line or a 3D surface.

37. The program carrier device of claim 36, wherein the 3D line is a 2D polyline in a 2D seismic section or a vertical section through a 3D seismic volume.

38. The program carrier device of claim 36, wherein the 3D surface is interpolated or extrapolated on multiple 2D seismic sections or on vertical sections through a 3D seismic volume.

\* \* \* \* \*